United States Patent
Isogai et al.

(10) Patent No.: US 7,805,091 B2
(45) Date of Patent: Sep. 28, 2010

(54) IMAGE FORMING APPARATUS DETECTING STATE OF APPARATUS TO DISPLAY MESSAGE

(75) Inventors: Yoshitaka Isogai, Machida (JP); Yu Iritani, Chofu (JP); Shin Sugiura, Wako (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 877 days.

(21) Appl. No.: 11/586,674

(22) Filed: Oct. 26, 2006

(65) Prior Publication Data

US 2008/0003010 A1 Jan. 3, 2008

(30) Foreign Application Priority Data

Jun. 29, 2006 (JP) .............................. 2006-180028

(51) Int. Cl.
G03G 15/00 (2006.01)
(52) U.S. Cl. ......................................................... 399/81
(58) Field of Classification Search .................... 399/81
See application file for complete search history.

(56) References Cited

U.S. PATENT DOCUMENTS

| | | | |
|---|---|---|---|
| 5,761,480 A | 6/1998 | Fukada et al. | |
| 6,069,624 A | 5/2000 | Dash et al. | |
| 7,164,486 B1 | 1/2007 | Nakamura et al. | |
| 2002/0191980 A1 | 12/2002 | Kudo | |
| 2003/0218785 A1 | 11/2003 | Sato | |

FOREIGN PATENT DOCUMENTS

| | | |
|---|---|---|
| JP | 1-169244 | 11/1989 |
| JP | 4-121361 | 4/1992 |
| JP | 05-207209 | 8/1993 |
| JP | 6-65920 | 9/1994 |
| JP | 07-312668 | 11/1995 |
| JP | 07-312681 | 11/1995 |
| JP | 9-37015 | 2/1997 |
| JP | 9-160441 | 6/1997 |
| JP | 11-134129 | 5/1999 |
| JP | 2000-162009 A | 6/2000 |
| JP | 2000-333026 | 11/2000 |
| JP | 2005-161578 A | 6/2005 |
| JP | 2005-164681 A | 6/2005 |
| JP | 2005274811 A * | 10/2005 |

OTHER PUBLICATIONS

European Search Report Mailed on Jan. 16, 2007 for European Patent Application No. 06020396.5. 6 pages.
Japanese Office Action, mailed Jun. 24, 2008, directed to counterpart Japanese Application No. 2006-180028; 4 pages.
Japanese Office Action mailed on Oct. 21, 2008 directed towards counterpart foreign application No. 2006-180028; 6 pages.

* cited by examiner

*Primary Examiner*—David M Gray
*Assistant Examiner*—Andrew V Do
(74) *Attorney, Agent, or Firm*—Morrison & Foerster LLP

(57) ABSTRACT

A message display portion is provided on each of a plurality of faces of an image forming apparatus. A state of the image forming apparatus is detected, and a message is displayed on a message display portion facing in the direction of a user to whom a notification should be given. Therefore, the state of the apparatus can be shown to each user in a user-friendly manner.

21 Claims, 23 Drawing Sheets

FIG.15

| DISPLAY LOCATION SETTING EXAMPLE ||
|---|---|
| INDIVIDUAL NAME | DISPLAY LOCATION |
| MR. A | FRONT FACE DISPLAY PORTION |
| MR. B | RIGHT FACE DISPLAY PORTION |
| MR. C | LEFT FACE DISPLAY PORTION |
| MR. D | BACK FACE DISPLAY PORTION |
| MR. E | FRONT FACE DISPLAY PORTION |

OUTPUT FOR MR. IRITANI IS FINISHED

PLEASE SUPPLY A4 PAPER

IMAGE FORMING APPARATUS DETECTING STATE OF APPARATUS TO DISPLAY MESSAGE

This application is based on Japanese Patent Application No. 2006-180028 filed with the Japan Patent Office on Jun. 29, 2006, the entire content of which is hereby incorporated by reference.

BACKGROUND OF THE INVENTION

1. Field of the Invention

The present invention relates to an image forming apparatus and a method of controlling an image forming apparatus, and more particularly to an image forming apparatus capable of detecting a state of the apparatus to display a message and a method of controlling an image forming apparatus.

2. Description of the Related Art

Image forming apparatuses such as MFP (Multi Function Peripheral), printers, and facsimile machines are conventionally known. In image forming apparatuses, display during the normal operation/error occurrence is mainly made on an operation panel, concerning acceptance of jobs, printing, availability of consumables such as paper and toner, and the like.

In such a technique, the user cannot obtain conveyed information unless the user goes to the machine. Therefore, the user first goes to the machine, then returns to his own PC (personal computer) to reissue a print instruction, and pick up the paper, which are physically wasting operations.

In order to solve the aforementioned problem, for example, utility software may be installed beforehand in PC to monitor the state of the apparatus. For example, management software displays information on PC in the event of a problem.

Japanese Laid-Open Patent Publication No. 07-312668 discloses a facsimile device connected to a host computer to specify a recipient of reception data and inform the user of the same.

Japanese Laid-Open Patent Publication No. 05-207209 discloses an image forming apparatus provided with two operation panels to allow an operation from various directions.

Japanese Laid-Open Patent Publication No. 11-134129 discloses an information processing apparatus provided with an operation panel upright on the top portion of the main body.

Japanese Laid-Open Patent Publication No. 07-312681 discloses an image forming apparatus provided with an LED display portion in the lower right of the panel such that an operator at a distance from the apparatus can identify an abnormal state.

As described above, installation of utility software in PC beforehand is troublesome and complicates the system.

SUMMARY OF THE INVENTION

The present invention provides an image forming apparatus capable of indicating a state of the apparatus in a user-friendly manner, and a method of controlling an image forming apparatus.

In accordance with an aspect of the present invention, an image forming apparatus having a plurality of faces includes: a printer printing an image; a first message display portion provided on a first face of the plurality of faces; a second message display portion provided on a second face facing in a direction different from the first face of the plurality of faces; a state detector detecting a state of the image forming apparatus; a decider deciding a message to be displayed on at least one of the first message display portion and the second message display portion based on a result of detection by the state detector; and a display portion displaying the decided message on at least one of the first message display portion and the second message display portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 shows a specific example of information stored in a display location information storage area.

DESCRIPTION OF THE PREFERRED EMBODIMENTS

In the following, an image forming apparatus in an embodiment in accordance with the present invention will be described. The image forming apparatus physically displays a visually recognizable message on the apparatus. The displayed message allows the user to recognize a state of the apparatus remotely to some extent. Therefore, wasting operations can be eliminated during use of the apparatus. Message display portions are provided on the respective faces of the image forming apparatus which face to different directions.

The message to be displayed may include information about the operation of the apparatus or general information other than the operation of the apparatus (for example, weather forecast, news, stock quotation, interoffice message). Such general information can be received from database on a network as appropriate for display. Therefore, the convenience of the image forming apparatus as an information terminal can be improved.

Figure 1:
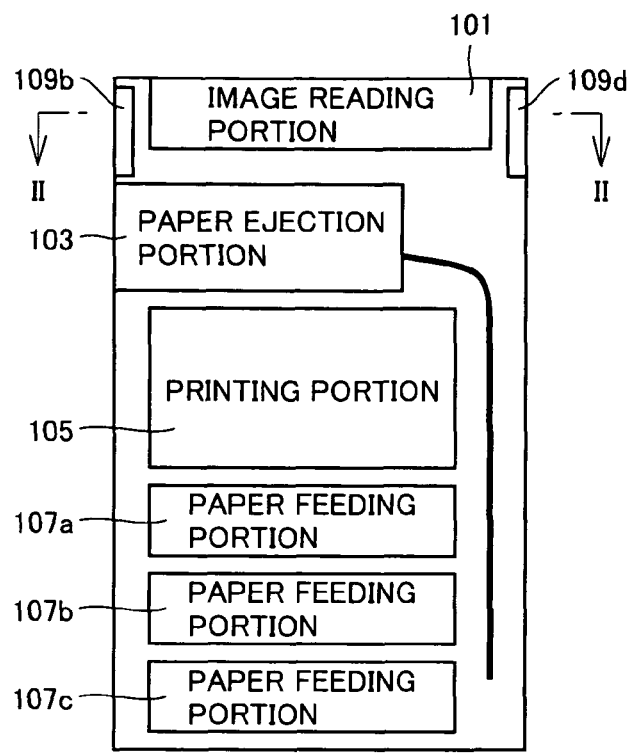
FIG. 1 shows a configuration of an image forming apparatus in accordance with an embodiment of the present invention.
Figure 2:
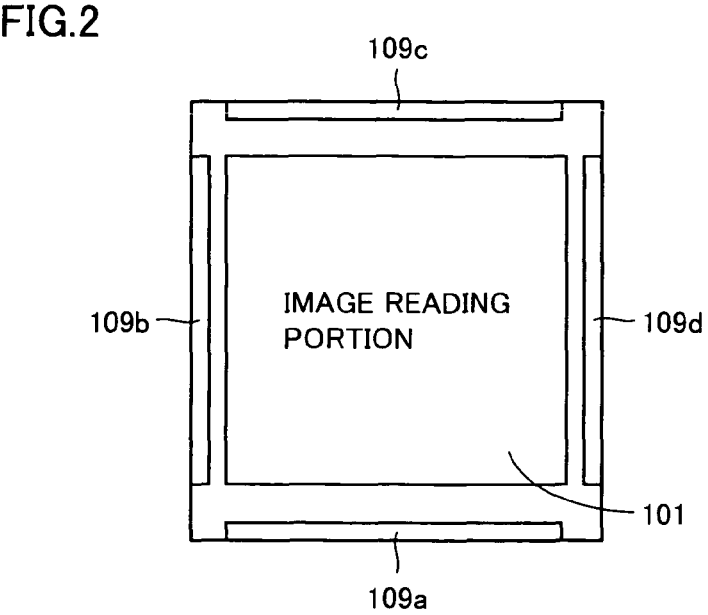
FIG. 2 is a cross sectional view taken along line II-II in FIG. 1.

FIG. 1 shows a configuration of an image forming apparatus in accordance with an embodiment of the present invention. FIG. 2 is a cross sectional view taken along line II-II in FIG. 1.

As shown in the figure, the image forming apparatus includes a light source irradiating a document, an image reading portion 101 including a CCD sensor and the like, a paper ejection portion 103 ejecting paper having an image printed thereon, a printing portion 105 including a printer engine to print an image on paper, and a plurality of paper feeding portions 107a-107c storing different kinds of paper. Message display portions 109a-109d are provided on the respective faces surrounding the four sides of the image forming apparatus. Each of message display portions 109a-109d can display characters and symbols in such a size that the user can see remotely to some extent.

Figure 3:
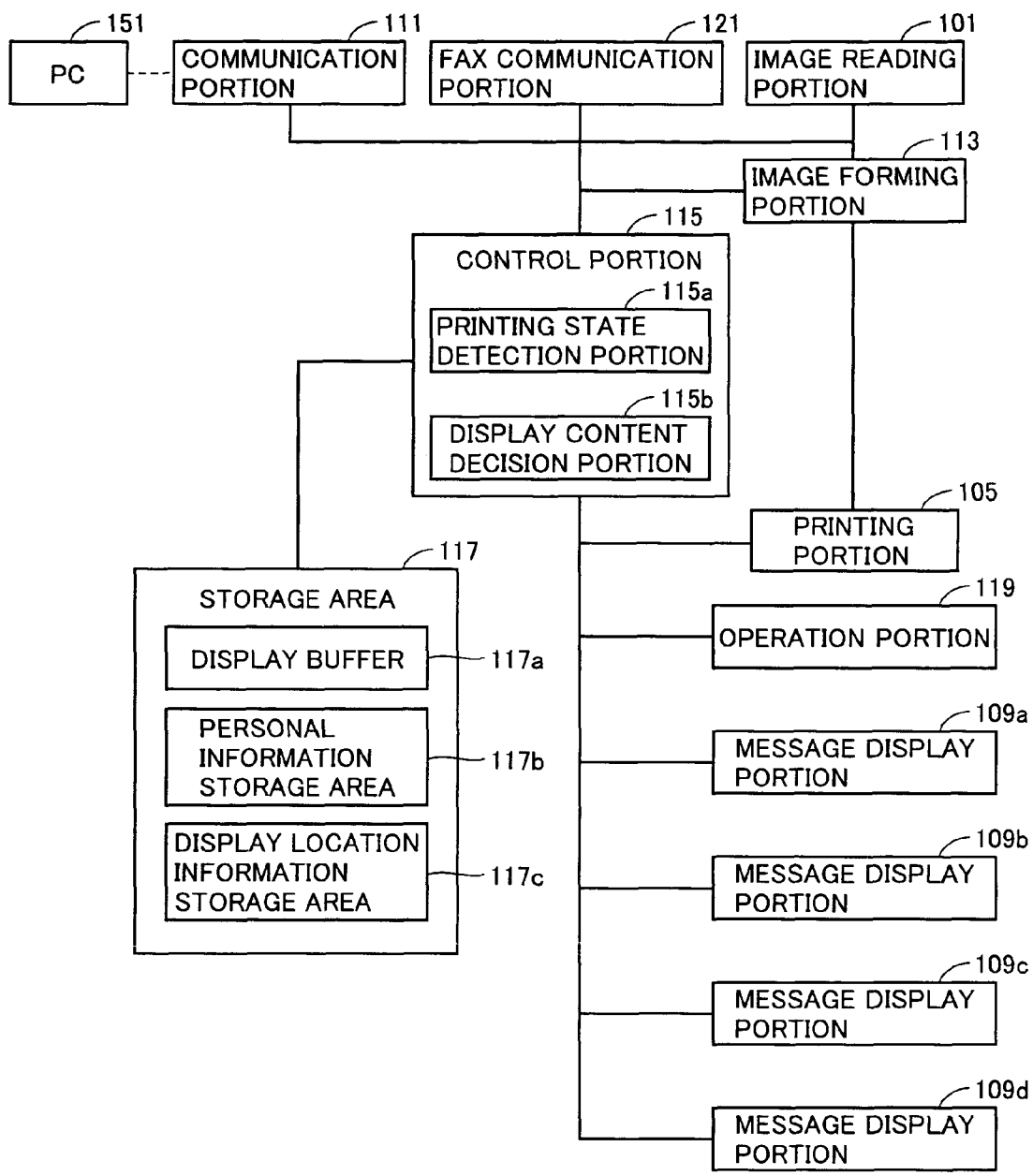
FIG. 3 is a block diagram showing a hardware configuration of the image forming apparatus.

FIG. 3 is a block diagram showing a hardware configuration of the image forming apparatus.

Referring to the figure, the image forming apparatus is configured with a communication portion 111 communicating with a PC 151 connected via a network, a FAX communication portion 121 for facsimile communications with an external device, image reading portion 101, an image forming portion 113 forming an image to be printed, a control portion 115 controlling the apparatus as a whole, a storage area 117 formed of a storage device such as a hard disk or memory, printing portion 105, an operation portion 119 accepting an input from the user and displaying information, and message display portions 109a-109d.

Control portion 115 includes a printing state detection portion 115a detecting a state of printing portion 105 and the image forming apparatus as a whole, and a display content decision portion 115b deciding a display content.

Storage area 117 includes a display buffer 117a storing data for display, a personal information storage area 117b storing personal information of a plurality of users, and a display location information storage area 117c storing a display portion and a display location where a particular message is displayed.

The printing state includes print completion, paper jam, and paper empty states, and the overall state of the image forming apparatus such as FAX reception and reading completion.

The image data input via a network or by image reading portion 101 is converted into print data in image forming portion 113. Based on this data, printing portion 105 prints an image.

Printing portion 105 may employ, for example, a laser beam-type electrostatic photography scheme, an LED-type electrostatic photography scheme, or an inkjet printing scheme. In addition, a state of control portion 115 such as FAX reception or print start can also be detected by printing state detection portion 115a.

Printing state detection portion 115a may employ a mechanism that counts ejection of print paper using an optical sensor and an electromagnetic induction mechanism that detects passage of paper by a movement of a lever. The operation of each of these portions is monitored by control portion 115.

Control portion 115 is notified of the state of output detected by printing state detection portion 115a. Control portion 115 thus determines printing of which image data is completed. At the same time, for example, if first data of which printing is completed is input from image reading portion 101, control portion 115 determines that the task is "copy" based on that information. Such a determination is made by a program that is input beforehand.

Control portion 115 inputs information to storage area 117. Storage area 117 forms a message to be displayed, in display buffer 117a based on this information. The message is, for example, "copy has been completed."

Storage area 117 feeds the formed message back to control portion 115. In response, control portion 115 issues a signal to message display portions 109a-109d to display the message.

Message display portions 109a-109d display the message based on the signal issued from control portion 115. The mechanism for display may employ, for example, an LED display, an LCD display, an EL display, or the like.

For example, if the first data of which printing is completed is input from communication portion 111, control portion 115 refers to personal information storage area 117b of storage area 117 for from where a print instruction originates, based on communication information. Furthermore, in storage area 117, display location storage area 117c is referred to for which display portion should receive a message and then specifies the same, based on the originator information specified by personal information storage area 117b.

Furthermore, display buffer 117a forms a message to be displayed based on the information from control portion 115 and the specified personal information. The message is, for example, "printing for Mr. A. has been completed".

Storage area 117 feeds the formed message and the specified display location information back to control portion 115. In response, control portion 115 issues a signal, for example, to message display portion 109b to display this message.

Message display portion 109b displays the message based on the signal issued from control portion 115.

Furthermore, the image data input by FAX communication portion 121 is converted into print data in image forming portion 113, so that printing portion 105 prints an image based on this data. At the same time, FAX communication portion 121 notifies control portion 115 of the reception of FAX image and the received image data.

Control portion 115 determines that the task is "facsimile" based on this information. This is determined by a program that is input beforehand. Control portion 115 extracts a destination from the sent image data and the like. The extraction uses, for example, character analysis by OCR, pattern matching, or the like.

Control portion 115 inputs information to storage area 117. In storage area 117, a message to be displayed is formed based on this information in display buffer 117a. The message is, for example, "fax for Mr. A has been received" or the like.

Then, storage area 117 feeds the formed message back to control portion 115. In response, control portion 115 issues a signal to message display portions 109a-109d to display the message.

In addition, here, personal information storage area 117b specifies a user based on the obtained destination, and display location information storage area 117c determines the display location for the specified user, so that the message can be displayed in a predetermined display portion.

Figure 4:
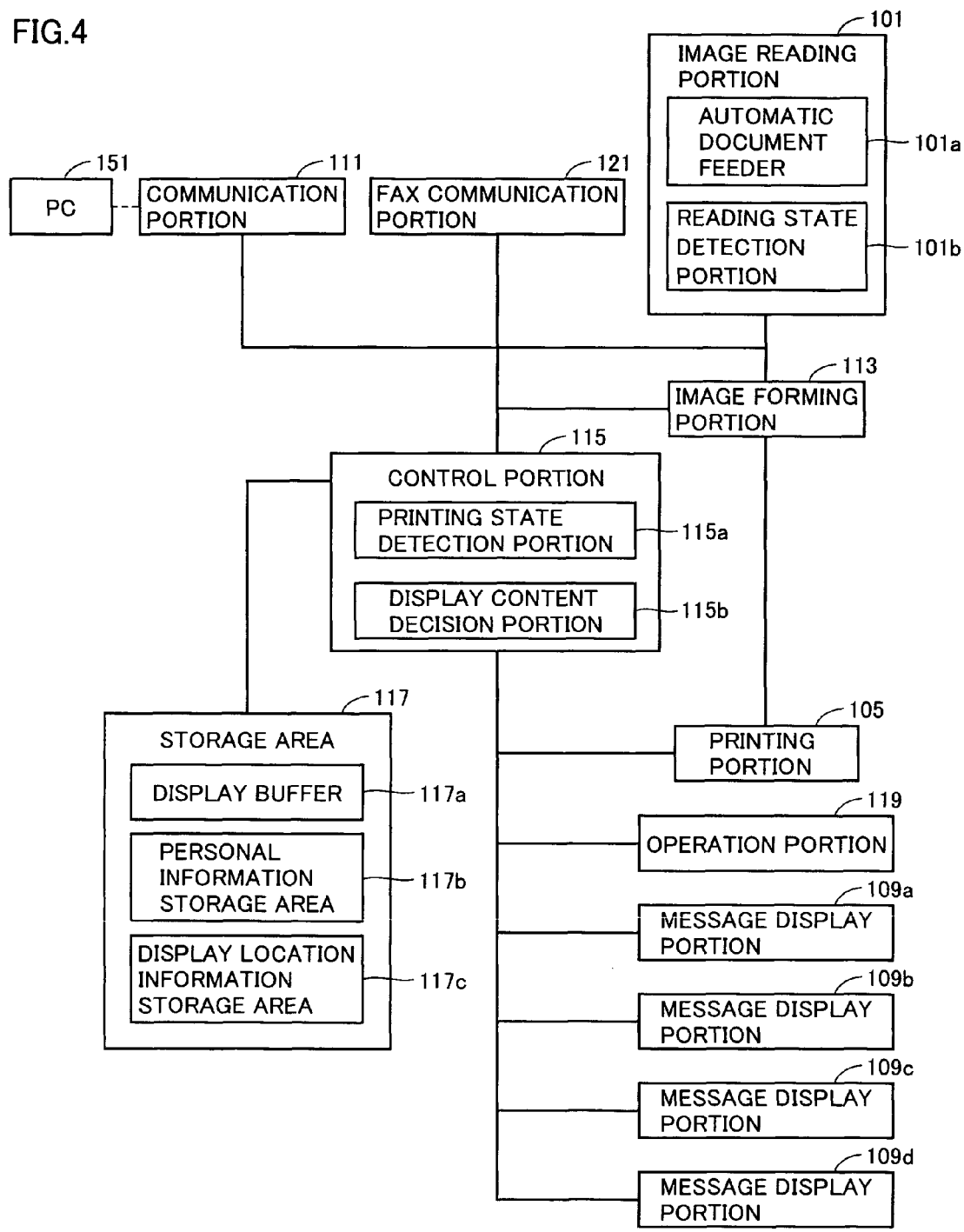
FIG. 4 shows a modification of the configuration in FIG. 3.

FIG. 4 shows a modification of the configuration in FIG. 3.

In FIG. 4, image reading portion 101 includes an automatic document feeder 101a and a reading state detection portion 101b. Reading state detection portion 101b may employ a mechanism that counts ejections of copy paper using an optical sensor or an electromagnetic induction mechanism that detects passage of paper based on a movement of a lever.

Image reading portion 101 notifies control portion 115 that reading of a document has been completed, using reading state detection portion 101b.

Based on this information and, for example, trigger information from the operation panel (operation portion 119) that this task is reading only, control portion 115 determines that "scanning is finished" or the like. This is determined by a program that is input beforehand.

Control portion 115 inputs information to storage area 117.

Based on this information, storage area 117 forms a message to be displayed in display buffer 117a. The message is, for example, "the scanning operation of job 005 is finished", or the like.

Storage area 117 feeds the formed message back to control portion 115. In response, control portion 115 issues a signal to message display portions 109a-109d to display the message.

Furthermore, control portion 115 notifies storage area 117 of the start, end, or error of a certain task, if any. Storage area 117 specifies information of the originator of that task in personal information storage area 117b based on the kind of the task and the communication information of the task, and then refers to display location information storage area 117c.

Display location information storage area 117c specifies which display portion should receive a message based on the reference information.

On the other hand, display buffer 117a forms a message to be displayed based on the information from control portion 115 and the specified personal information. The message is, for example, "printing for Mr. A has been completed" or the like.

Then, storage area 117 feeds the formed message and the specified display location information to control portion 115. In response, control portion 115 issues a signal, for example, to message display portion 109b to display the message.

By repeating such processes, each message display portion is given a message formed for each task or error and a specified display location from control portion 115, so that each display portion displays a different message.

Figure 5:
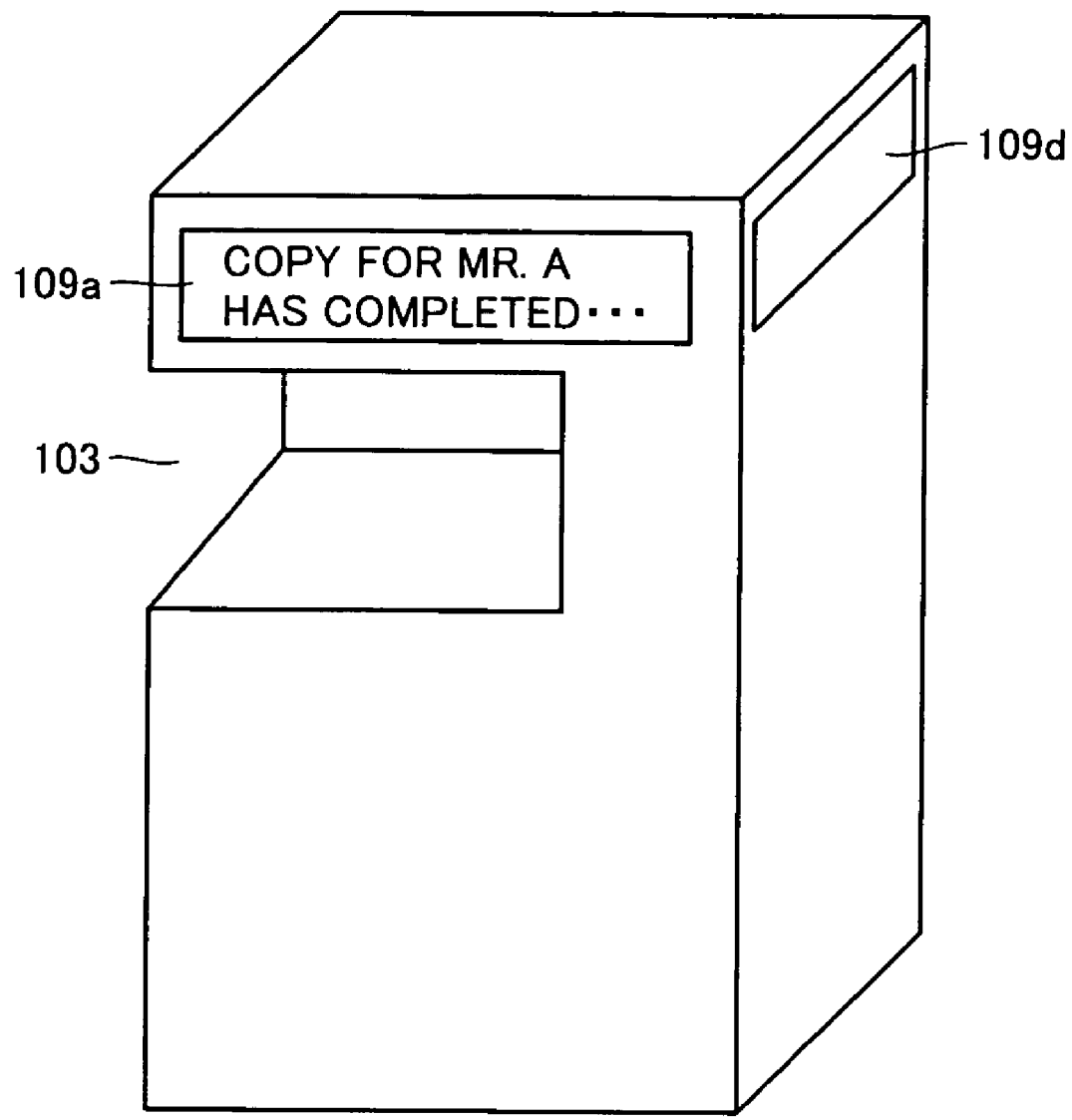
FIG. 5 is a perspective external view of the image forming apparatus.

FIG. 5 is a perspective external view of the image forming apparatus.

As shown in the figure, messages are displayed in message display portions 109a, 109d. Examples of displayed messages may include a message concerning operations, such as "Copy for Mr. A has been completed," "Fax for Mr. B has been received" or "Printing for Mr. C has been completed," and a message concerning a state of the apparatus, such as "Paper jam occurs. Please remove the paper," "Open the lower door to clear the paper jam," "Yellow toner runs out. Please replace the toner cartridge with a new one," or "A4 paper runs out. Please supply paper."

Alternatively, a message irrelevant to the state of the apparatus may be displayed, such as "Today's foreign exchanges. 1 dollar=117 yen . . . ," "Tomorrow's weather: Tokyo region=fair, occasionally cloudy. The chance of rain is . . . ," "Topics: at today's budget council, Prime Minister Koizumi . . . ," "Company news 2006/02/08 President's message: at today's board meeting . . . ."

Figure 6:
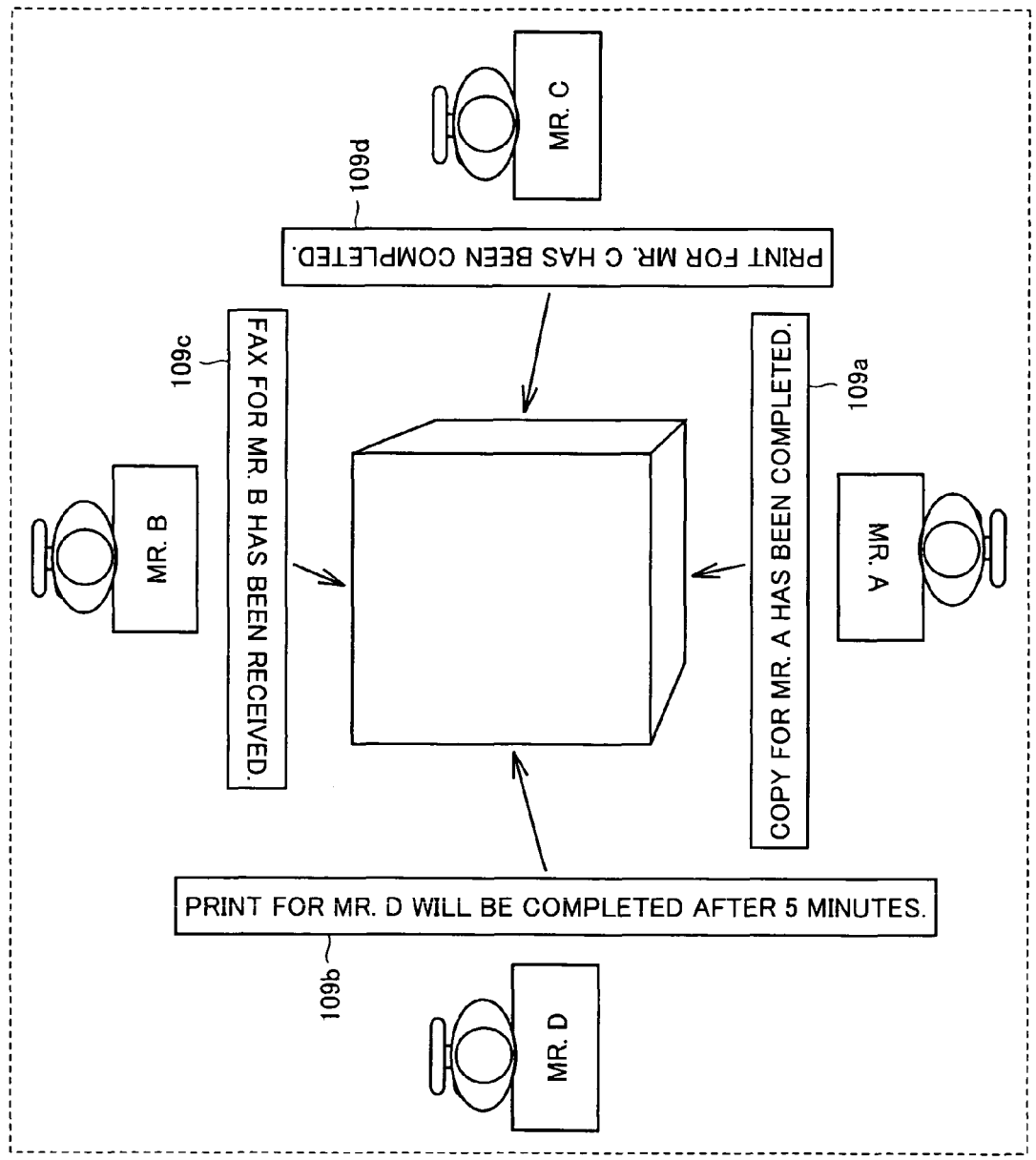
FIGS. 6-8 are plan views showing exemplary display of the image forming apparatus.

FIG. 6 is a plan view showing exemplary display of the image forming apparatus.

In this figure, the seats of Mr. A, Mr. B, Mr. C, Mr. D are arranged around the image forming apparatus. Mr. A is seated facing in the direction of message display portion 109a of the image forming apparatus. Mr. B is seated facing in the direction of message display portion 109c of the image forming apparatus. Mr. C is seated with message display portion 109d of the image forming apparatus on the right. Mr. D is seated with message display portion 109b of the image forming apparatus on the left.

In this case, it is set that a message for Mr. A appears on message display portion 109a, a message for Mr. D appears on message display portion 109b, a message for Mr. B appears on message display portion 109c, and a message for Mr. C appears on message display portion 109d. Accordingly, each user can see only a message for himself and no longer sees unnecessary messages.

Figure 7:
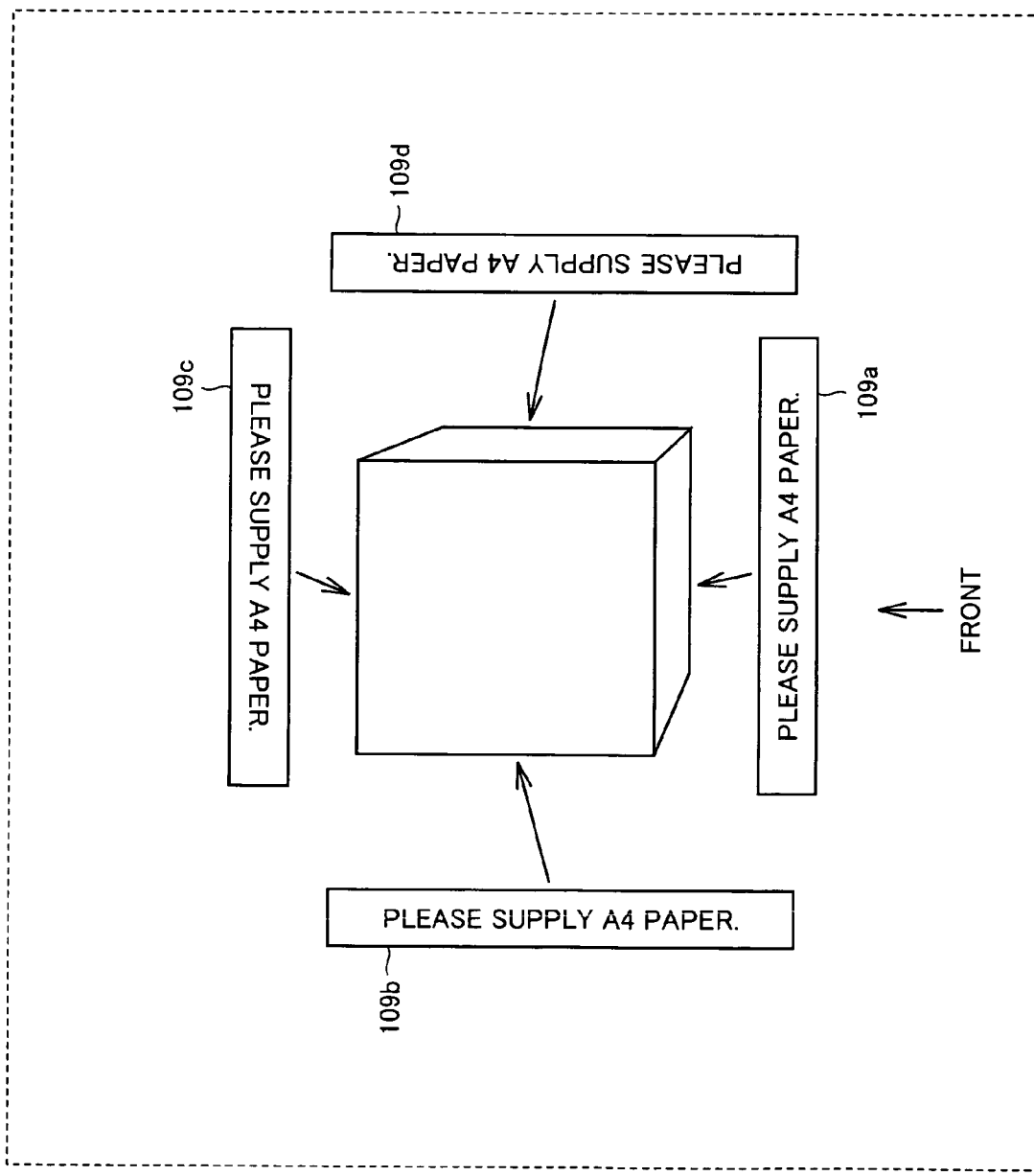

FIG. 7 is a plan view showing exemplary display of the image forming apparatus.

Here, the same message appears on each of message display portions 109a-109d, by way of example. For example, such a message "please supply A4 paper" should be given to everyone. The same display appears on all of message display portions 109a-109d to make it known to everyone.

Figure 8:
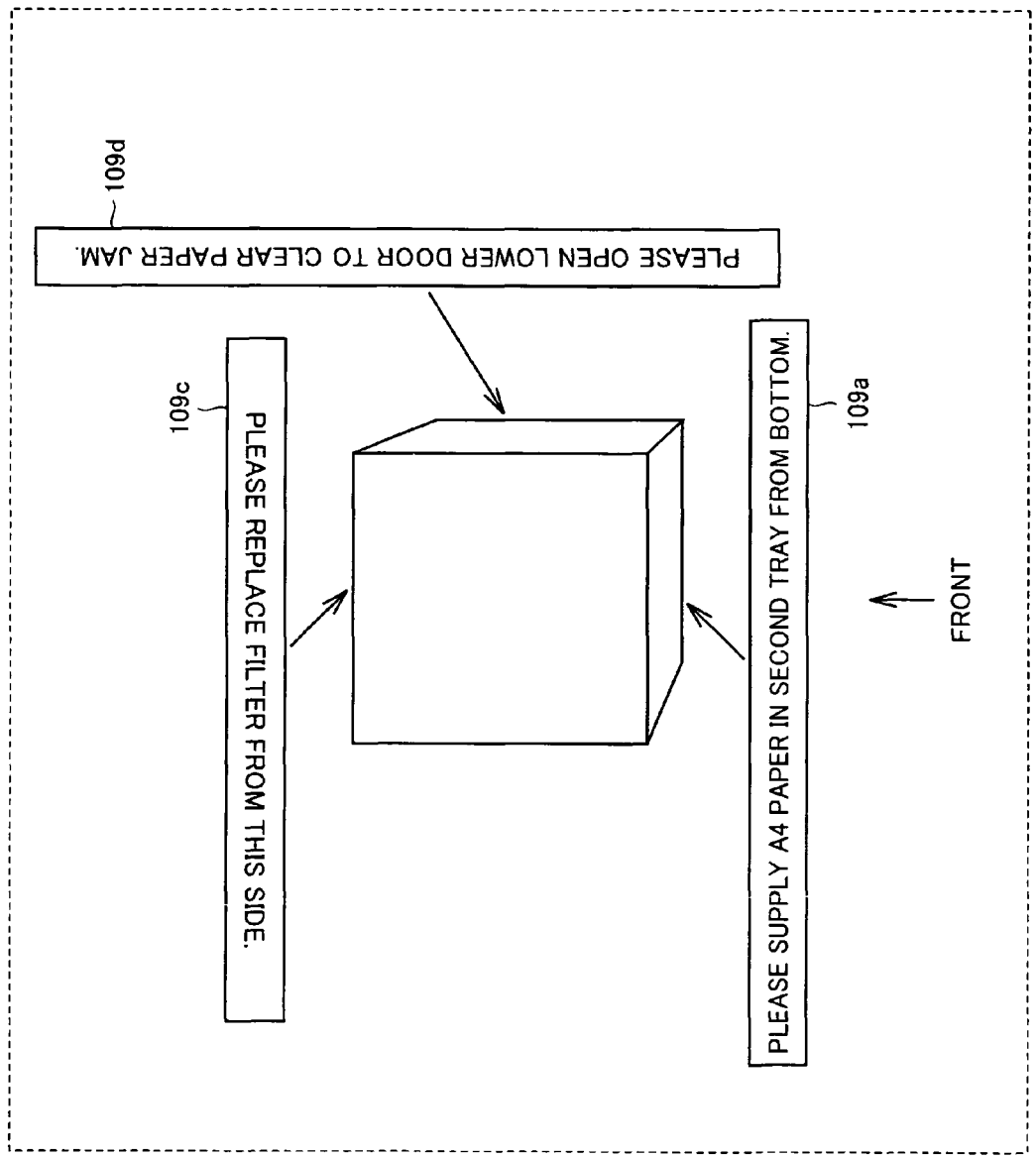

FIG. 8 is a plan view showing exemplary display of the image forming apparatus.

Here, the display location of the message display portion varies depending on the location of a member to be operated by a user in the image forming apparatus. For example, a message "please supply A4 paper in the second tray from the bottom" appears in message display portion 109a, a message "please replace the filer from this side" appears in message display portion 109c, and a message "please open the lower door to clear the paper jam" appears in message display portion 109d.

This is because the tray can be drawn at the face provided with message display portion 109a, the filer can be replaced at the face provided with message display portion 109c, and the paper jam can be cleared at the face provided with message display portion 109d.

Figure 9:
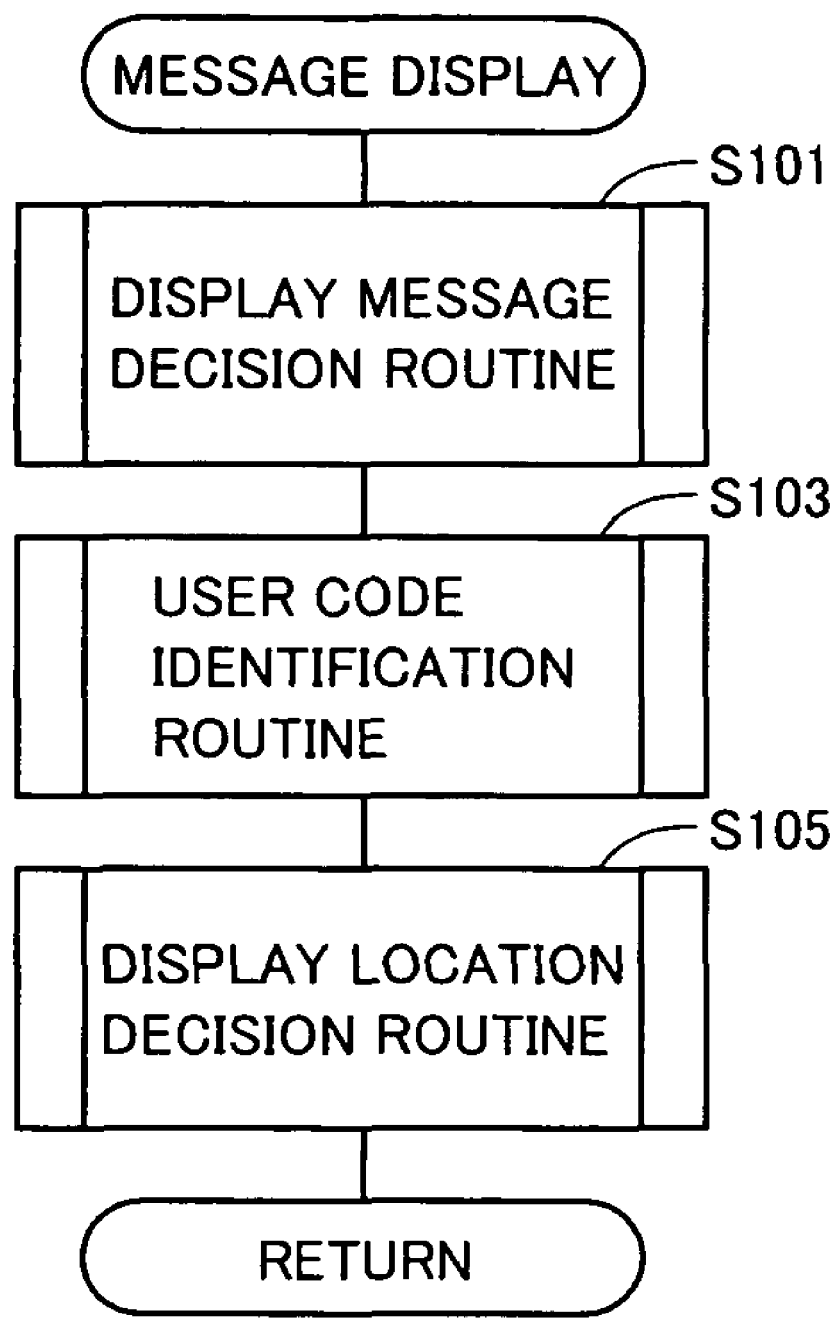
FIG. 9 is a flowchart illustrating a message display process of the image forming apparatus.

FIG. 9 is a flowchart illustrating a message display process of the image forming apparatus.

Referring to the figure, at step S101, a process of determining a state of the apparatus to decide a main sentence of a message to be displayed is performed. At step S103, a user code identification routine is performed to identify a user to whom the decided message is directed. At step S105, a process of deciding on which face display appears on a message display portion is performed.

These processes are performed in control portion 115 and display buffer 117a in storage area 117. Through these processes, display information on a message display portion is decided.

Figure 10:
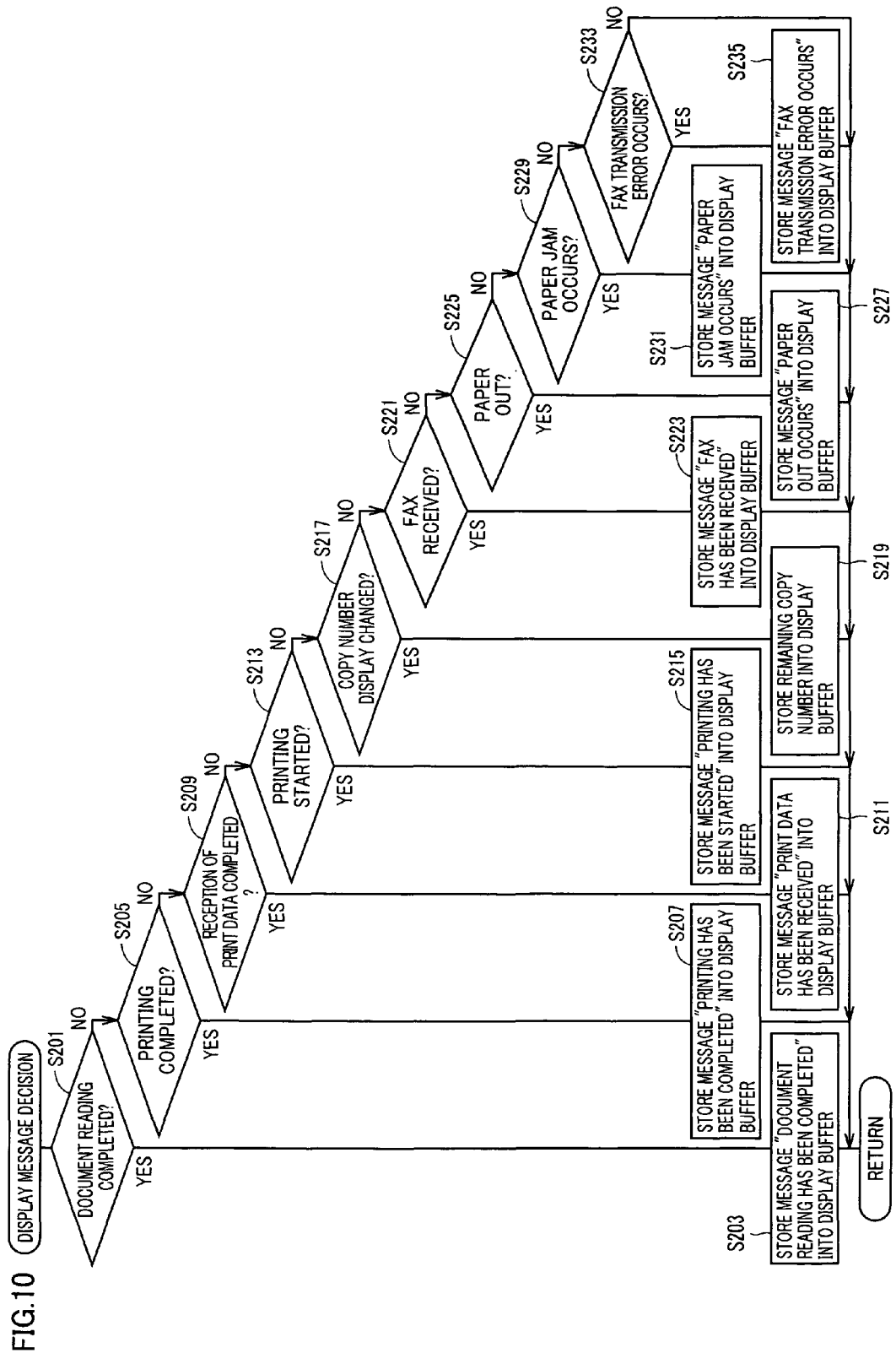
FIG. 10 is a flowchart illustrating a process of a display message decision routine (S101) in FIG. 9.

FIG. 10 is a flowchart illustrating a process of a display message decision routine (S101) in FIG. 9.

For example, in the image forming apparatus, reading state detection portion 101b provided in image reading portion 101 notifies control portion 115 that reading of a document is finished. Upon notification (YES at S201), control portion 115 inputs that information to storage area 117.

In storage area 117, based on this information, a message to be displayed is formed and stored in display buffer 117a (S203). The message is, for example, "document reading has been completed" or the like.

Following detection of a signal about the document reading completion, if control portion 115 is notified of the state of print completion which is detected by printing state detection portion 115a provided in control portion 115 (YES at S205), control portion 115 inputs information to storage area 117. In storage area 117, based on this information, a message to be displayed is formed and stored in display buffer 117a (S207). The message is, for example, "printing has been completed" or the like.

If control portion 115 is notified of the state of print data reception completion detected by communication portion 111 (YES at S209), control portion 115 inputs information to storage area 117. In storage area 117, based on this information, a message to be displayed is formed and stored in the display buffer (S211). The message is, for example, "print data has been received" or the like.

If control portion 115 is notified of the state of printing start detected by printing state detection portion 115a provided in control portion 115 (YES at S213), control portion 115 inputs information to storage area 117. In storage area 117, based on this information, a message to be displayed is formed and stored in display buffer 117a (S215). The message is, for example, "printing has been started" or the like.

If control portion 115 is notified of the state of number of copies detected by printing state detection portion 115a provided in control portion 115 (YES at S217), control portion 115 inputs information to storage area 117. In storage area 117, based on this information, a message to be displayed is formed and stored in display buffer 117a (S219). The message is, for example, "** more pages are left" or the like.

If control portion 115 is notified of the state of FAX data reception detected by FAX communication portion 121 (YES at S221), control portion 115 inputs information to storage area 117. In storage area 117, based on this information, a message to be displayed is formed and stored in display buffer 117a (S223). The message is, for example, "FAX has been received" or the like.

If control portion 115 is notified of the state of paper scarcity or paper-out detected by paper feeding portions 107a-107c (YES at S225), control portion 115 inputs information to storage area 117. In storage area 117, based on this information, a message to be displayed is formed and stored in display buffer 117a (S227). The message is, for example, "paper runs out" or the like.

If control portion 115 is notified of the state of paper jam detected by paper feeding portions 107a-107c or a detection portion provided in a paper path of printing portion 105 (YES at S229), control portion 115 inputs information to storage area 117. In storage area 117, based on this information, a message to be displayed is formed and stored in display buffer 117a (S231). The message is, for example, "paper jam occurs" or the like.

If control portion 115 is notified of the state of FAX transmission error detected by FAX communication portion 121 (YES at S233), control portion 115 inputs information to storage area 117. In storage area 117, based on this information, a message to be displayed is formed and stored in display buffer 117a (S235). The message is, for example, "FAX transmission error occurs" or the like.

The information detected last in a series of these operations is decided as a display message. It is noted that a series of these operations is controlled per unit time calculated for each received task and the last detected information within that time is employed as a display message. Furthermore, the decision routine may be triggered by a signal that indicates the state of the apparatus as described above, depending on a task.

Figure 11:
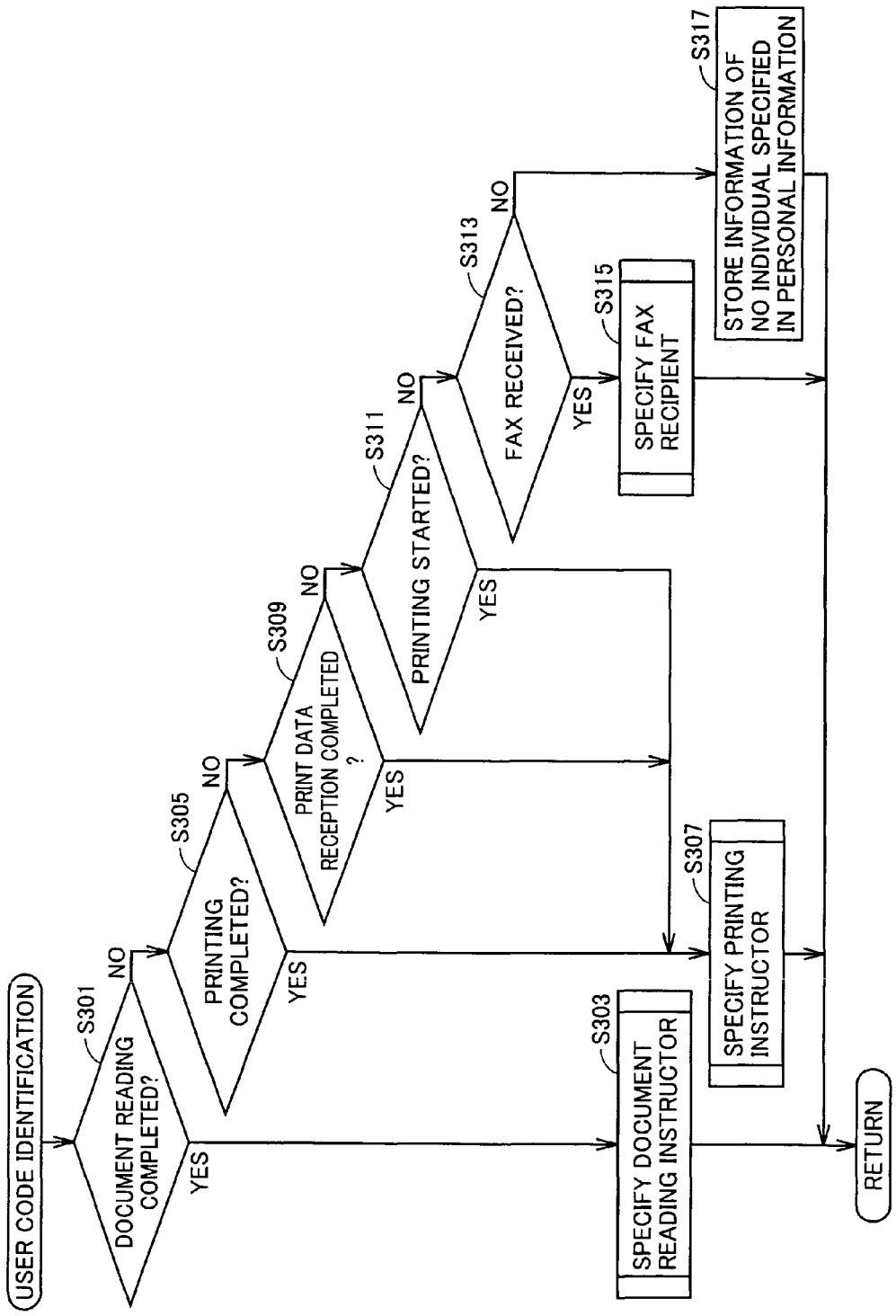
FIG. 11 is a flowchart illustrating a process of a user code identification routine (S103) in FIG. 9.

FIG. 11 is a flowchart illustrating a process of a user code identification routine (S103) in FIG. 9.

When reading state detection portion 101b provided in image reading portion 101 notifies control portion 115 that reading of a document is finished (YES at S301), control portion 115 inputs information to storage area 117. In storage area 117, based on this information, a document reading instructor is specified in personal information storage area 117b (S303).

If control portion 115 is notified of the state of printing completion detected by printing state detection portion 115a provided in control portion 115 (YES at S305), control portion 115 inputs information to storage area 117. In storage area 117, based on this information, a print instructor is specified in personal information storage area 117b (S307).

If control portion 115 is notified of the state of print data reception completion detected by communication portion 111 (YES at S309), control portion 115 inputs information to storage area 117. In storage area 117, based on this information, a print instructor is specified in personal information storage area 117b (S307).

If control portion 115 is notified of the state of printing start detected by printing state detection portion 115a provided in control portion 115 (YES at S311), control portion 115 inputs information to storage area 117. In storage area 117, based on this information, a print instructor is specified in personal information storage area 117b (S307).

If control portion 115 is notified of the state of FAX data reception detected by FAX communication portion 121 (YES at S313), control portion 115 inputs information to storage area 117. In storage area 117, based on this information, a FAX recipient is specified in personal information storage area 117b (S315).

If an individual is not finally specified, the display buffer stores as such (S317).

Figure 12:
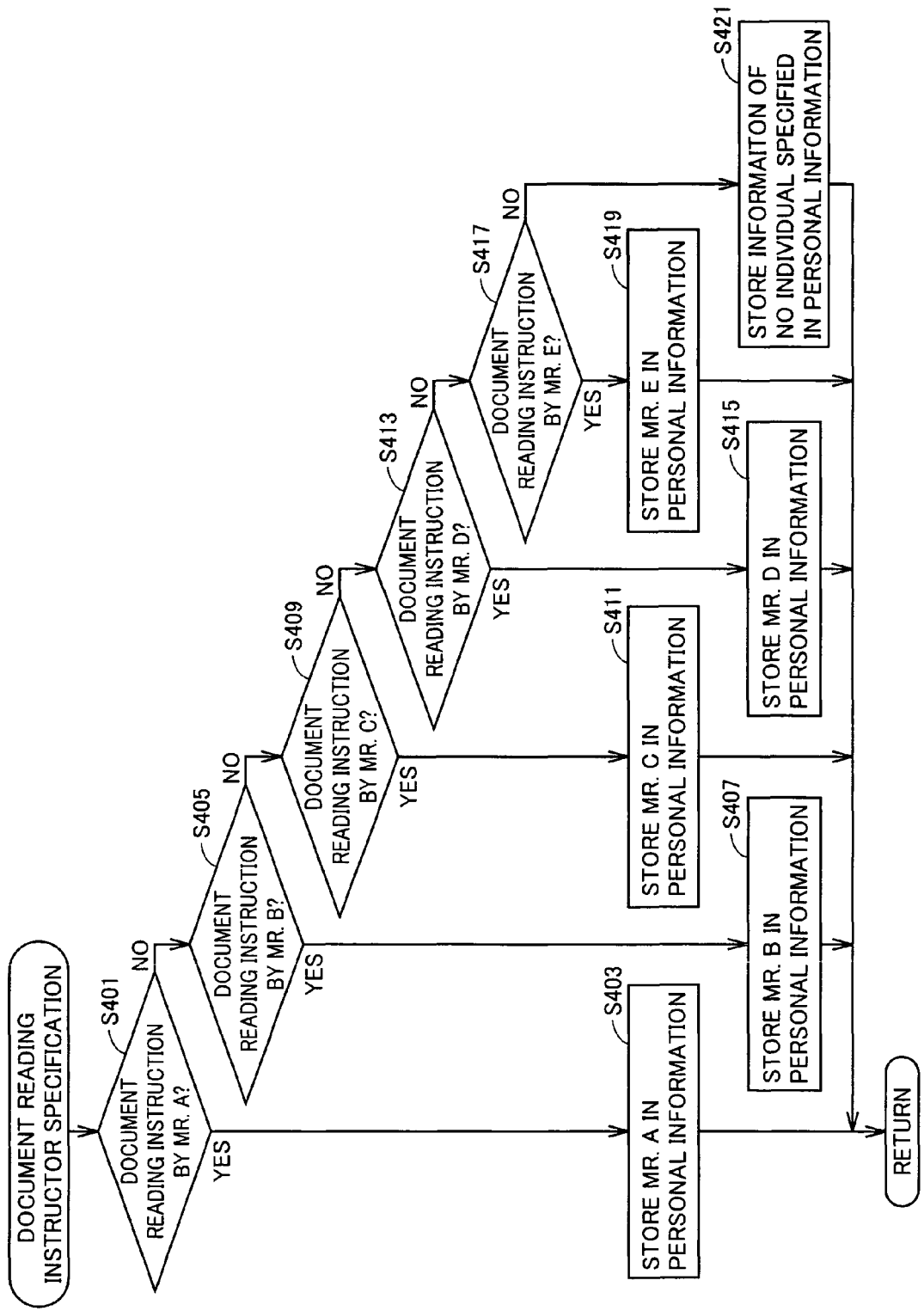
FIG. 12 is a flowchart illustrating the details of a document reading instructor specification process (S303) in FIG. 11.

FIG. 12 is a flowchart illustrating the details of a document reading instructor specification process (S303) in FIG. 11.

In the image forming apparatus, user codes are registered beforehand in personal information storage area 117b. The individual who assigns a task is specified based on the user code. This is done, for example, by matching the user code input in a log-in operation in the apparatus with the registered code. If a code matching a log-in code is found in the registered codes, personal information allocated to that code is called to specify the name.

More specifically, in FIG. 12, it is determined whether it is Mr. A who gave an instruction of document reading (S401), and if YES, the specified name information (here, Mr. A) is transferred to display buffer 117a so that a message to be displayed is formed and stored (S403). The message is, for example, "document reading for Mr. A has been completed" or the like.

If the log-in code is not Mr. A's (NO at S401), reference is then made to Mr. B's information, and then to Mr. C's information, one by one, so that the matching personal information is found out (S405-S419).

If an individual is not finally specified (NO at S417), the display buffer stores as such (S421). The message is, for example, "document reading for somebody has been completed" or the like.

Figure 13:
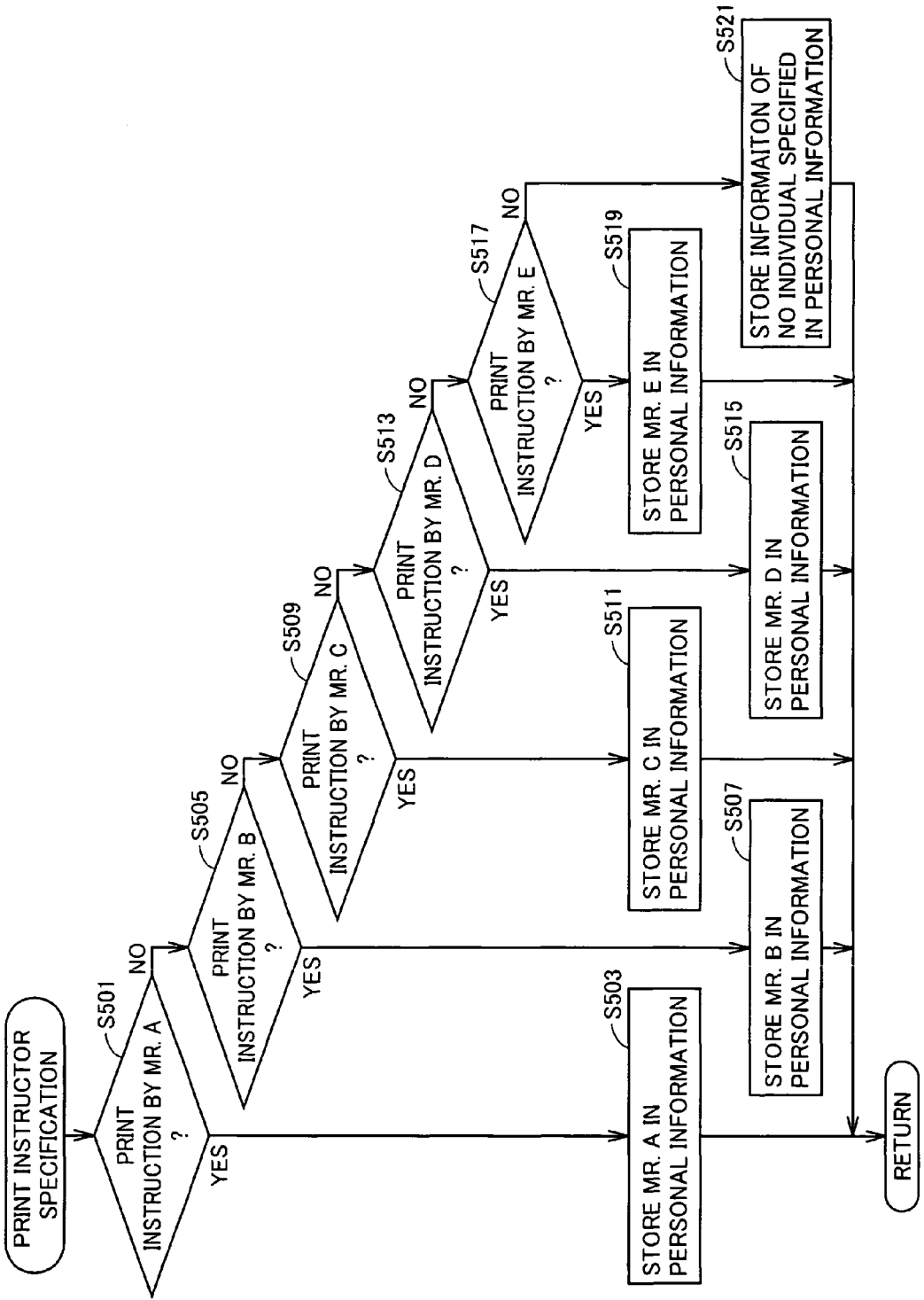
FIG. 13 is a flowchart illustrating the details of a print instructor specification process (S307) in FIG. 11.

FIG. 13 is a flowchart illustrating the details of a print instructor specification process (S307) in FIG. 11.

In the image forming apparatus, user codes are registered beforehand in personal information storage area 117b. The individual who assigned a task is specified based on the user code. This is done, for example, by matching the user code input in a log-in operation in the apparatus with the registered code. If a code matching a log-in code is found in the registered codes, personal information allocated to that code is called to specify the name. Alternatively, an IP address of PC that transmitted print data may be matched with an IP address allocated to the registered code for specification.

More specifically, in FIG. 13, it is determined whether it is Mr. A who gave an instruction to print (S501), and if YES, the specified name information (here, Mr. A) is transferred to display buffer 117a so that a message to be displayed is formed and stored (S503). The message is, for example, "printing for Mr. A has been completed" or the like.

If the log-in code or the IP address of PC that transmitted print data is not Mr. A's (NO at S501), reference is then made to Mr. B's information, and then to Mr. C's information, one by one, so that the matching personal information is found out (S505-S519).

If an individual is not finally specified (NO at S517), the display buffer stores as such (S521). The message is, for example, "printing for somebody has been completed" or the like.

Figure 14:
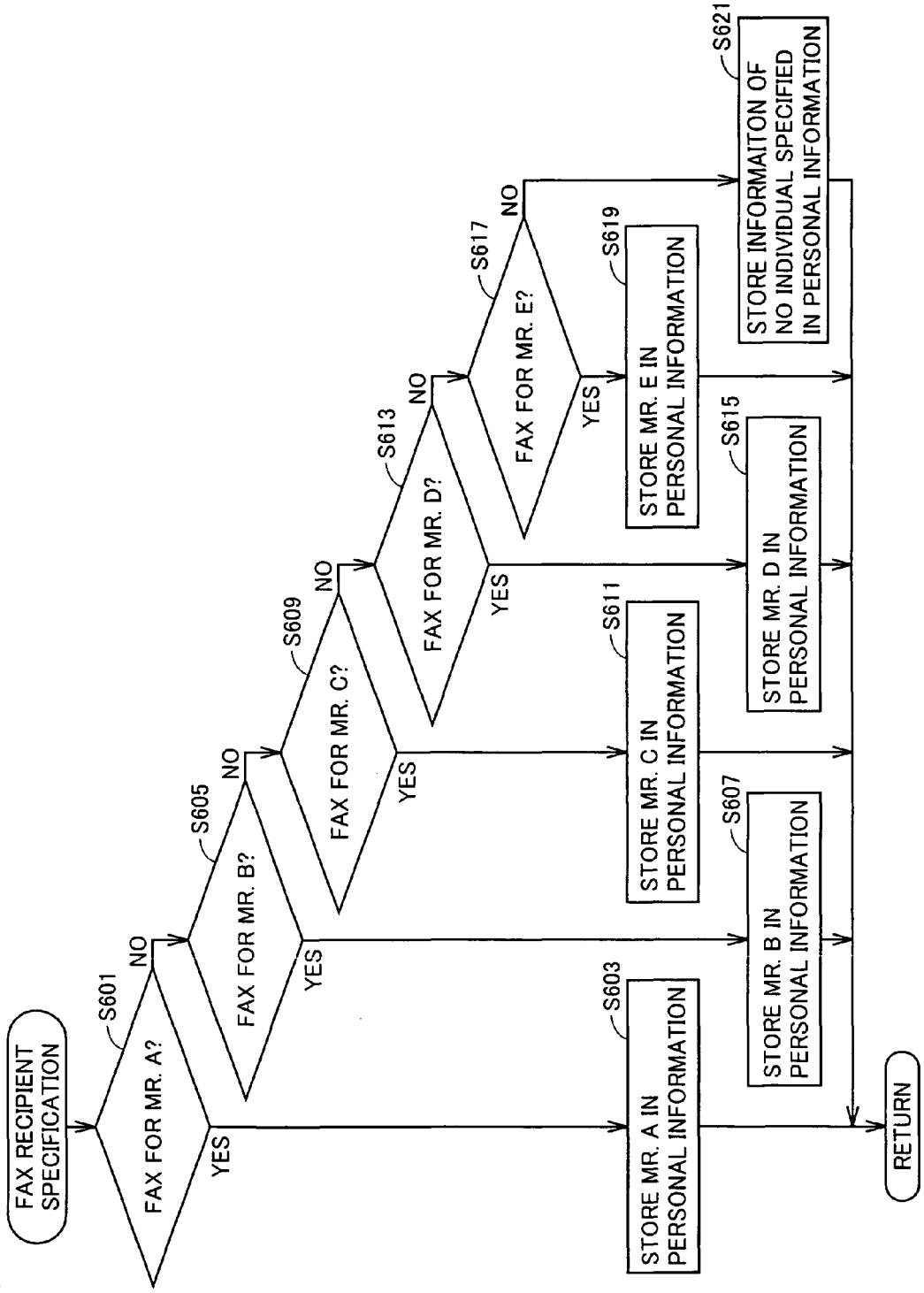
FIG. 14 is a flowchart illustrating the details of a FAX recipient specification process (S315) in FIG. 11.

FIG. 14 is a flowchart illustrating the details of a FAX recipient specification process (S315) in FIG. 11.

In the image forming apparatus, an individual who has received FAX is specified in personal information storage area 117b with reference to the user code registered beforehand. For example, a destination is extracted from image data received by control portion 115. The extraction uses character analysis by OCR, pattern matching, and the like. The extracted destination information is transferred to personal information storage area 117b to be matched with the name allocated to the code registered herein, thereby specifying an individual.

More specifically, in FIG. 14, it is determined whether it is Mr. A who receives FAX (S601), and if YES, the specified name information (here, Mr. A) is transferred to display buffer 117a so that a message to be displayed is formed and stored (S603). The message is, for example, "FAX for Mr. A has been received" or the like.

If the recipient is not Mr. A (NO at S601), reference is then made to Mr. B's information, then to Mr. C's information, one by one, so that the matching personal information is found out (S605-S619).

If an individual is not finally specified (NO at S617), the display buffer stores as such (S621). The message is, for example, "FAX for somebody has been received" or the like.

FIG. 15 shows a specific example of information stored in the display location information storage area.

As shown in the figure, which message display portion to be used for display is registered in association with individual names or user codes set by the users. This is set based on the location relationship of seats with respect to the image forming apparatus, as shown in FIG. 6.

Figure 16:
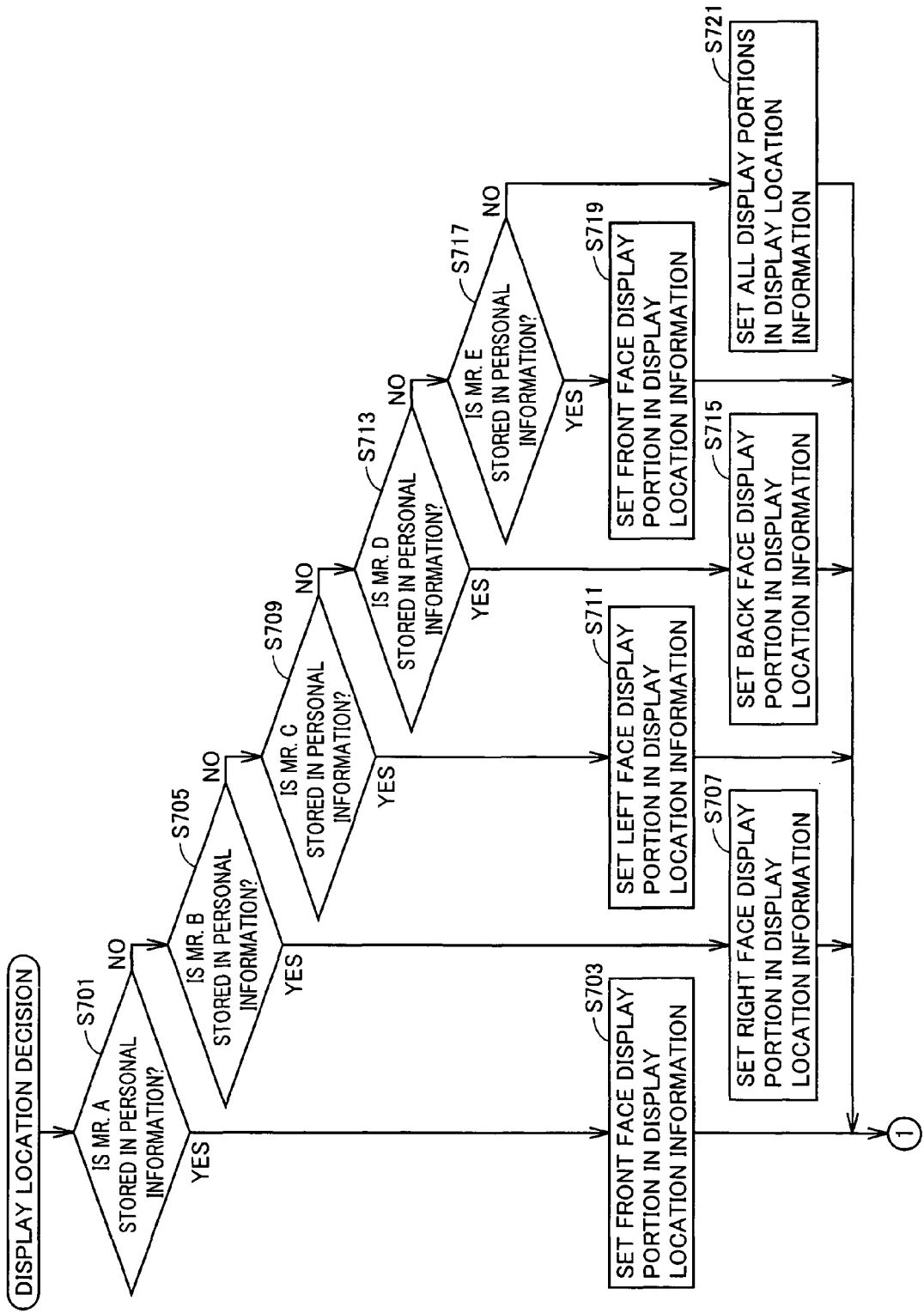
FIGS. 16 and 17 are flowcharts illustrating the details of a display location decision process (S105) in FIG. 9.
Figure 17:
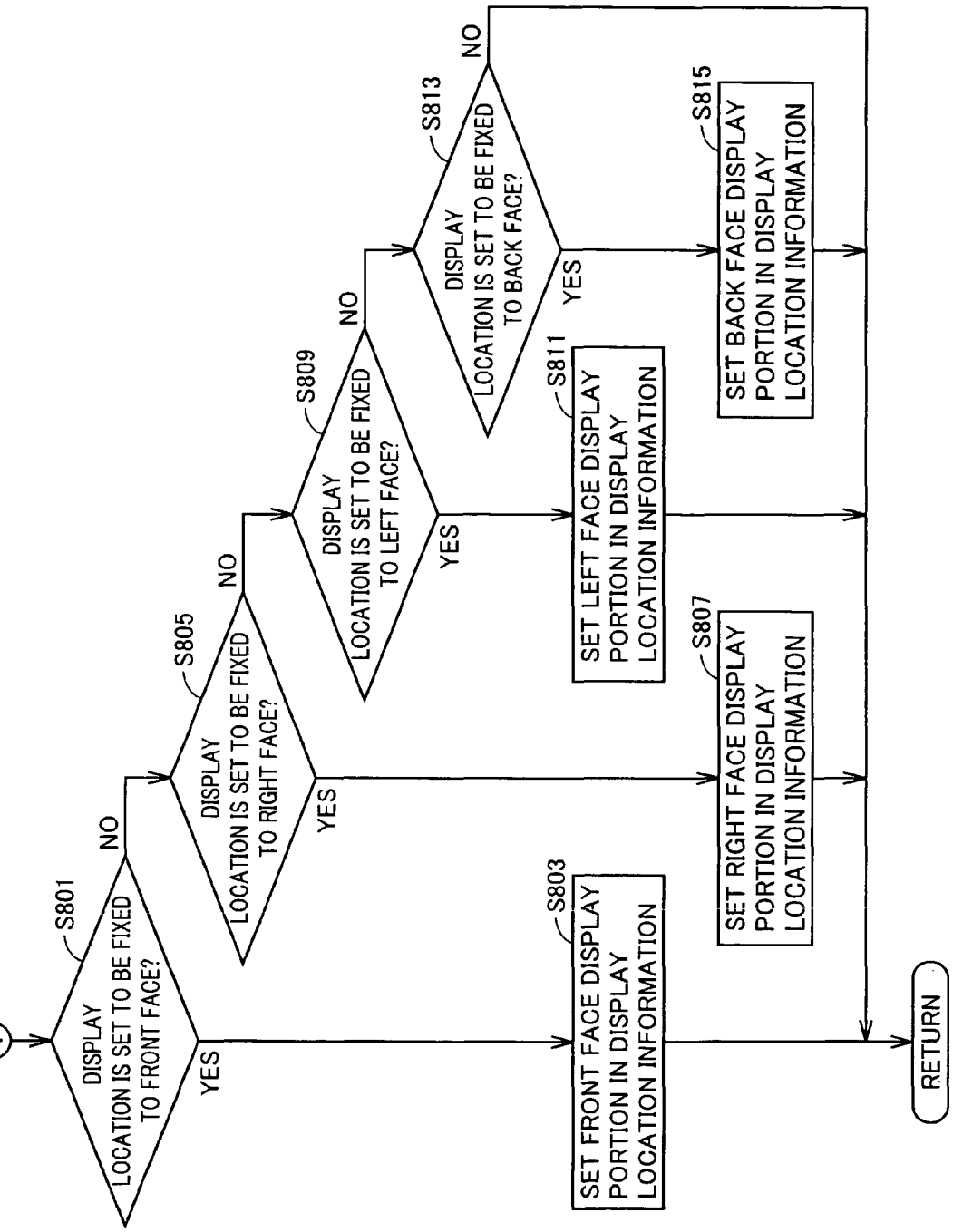

FIGS. 16 and 17 are flowcharts illustrating the details of a display location decision process (S105) in FIG. 9.

The image forming apparatus decides a display location based on the personal information specified in the user code identification routine (step S103 in FIG. 9).

More specifically, in FIG. 16, it is determined whether or not the message to be displayed is for Mr. A (S701), and if YES, message display portion 109a on the front face, which is the preliminarily stored, fixed display location for Mr. A (FIG. 15), is set as a display portion.

If the personal information is not Mr. A's (NO at S701), reference is then made to Mr. B's information and then to Mr. C's information, one by one, so that the matching personal information is found out and the display location is decided (S705-S719).

If personal information is not finally specified, or even if personal information can be specified but a fixed display location information is not provided (NO at S717), for example, display buffer 117a stores that such a message is displayed in all the message display portions (S721).

In addition, after a message display portion is specified based on personal information, it is determined whether or not a display location is fixed to message display portion 109a on the front face (S801), and if YES, message display portion 109a on the front face is set as a display portion (S803). This is a process where a message display location is fixed as shown in FIG. 8.

If the display portion is not fixed to the message display portion on the front face (NO at S801), a display location is decided by checking the message display portion on the right face and then the message display portion on the left face, one by one (S805-S815).

If a display location is not fixed (NO at S813), the display portion decided at steps S701-S721 is used as it is.

Figure 18:
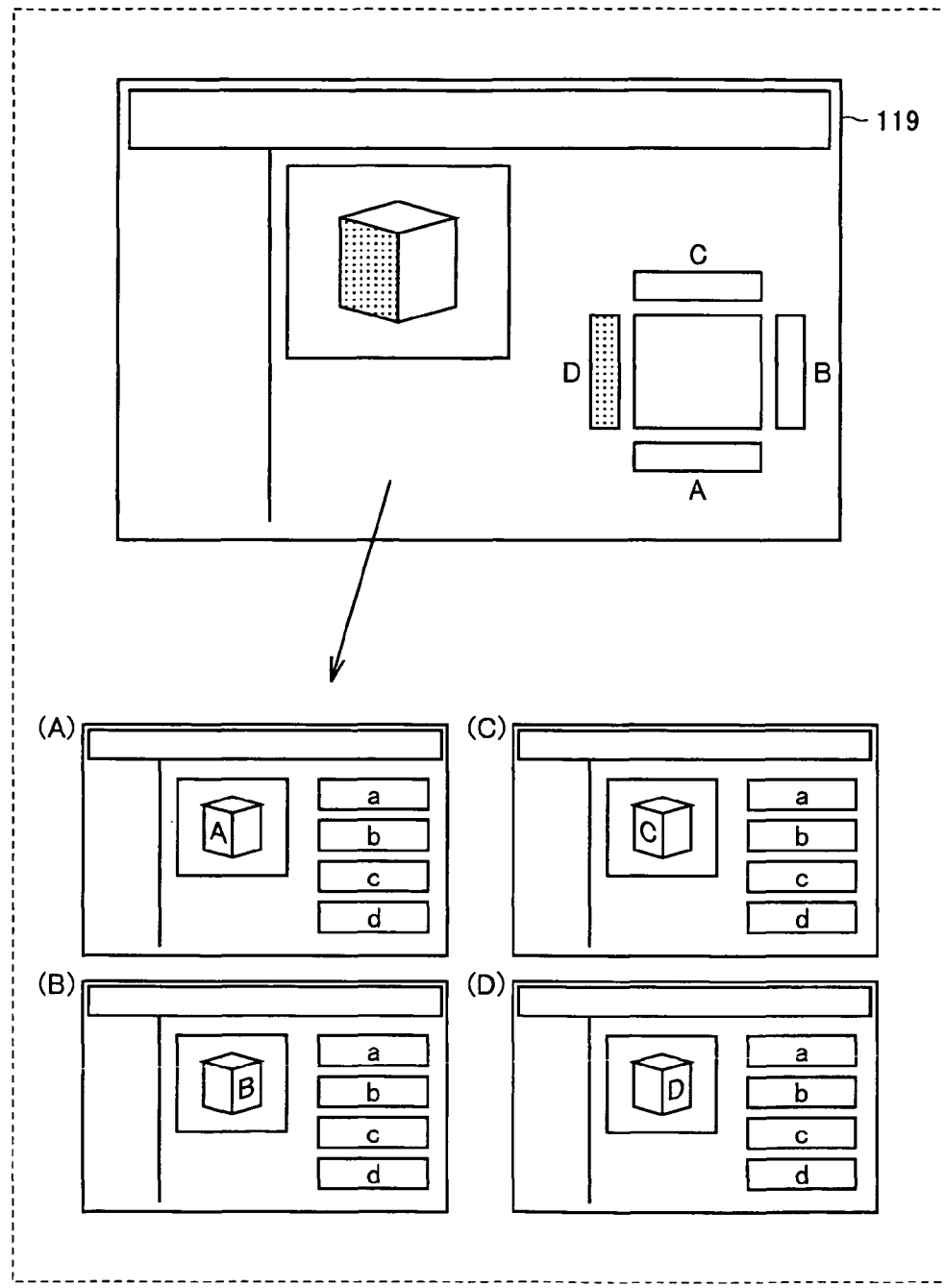
FIGS. 18 and 19 show specific examples of a setting window for a message display location.

FIG. 18 shows a specific example of a setting window for a message display location.

In the image forming apparatus, a name and a code of a particular individual are input using code input software from PC 151 connected via communication portion 111 or from operation portion 119 of the image forming apparatus. The input code is stored in personal information storage area 117b in storage area 117.

In addition, a message display portion that provides display for each individual is set using the PC screen or the operation window on operation portion 119.

In FIG. 18, setting is made using operation portion 119. First, the user selects a message display portion to be set on the screen of operation portion 119. Operation portion 119 includes a touch panel so that a display portion is selected from the displayed four display portions A-D by directly touching a picture of any location. In the example shown in the figure, the dotted D is selected.

When the desired one is selected from display portions A-D, transition is made to each of the states shown in (A)-(D). The windows (A)-(D) show that their respective display portions are selected.

The keys (a), (b), (c), (d) displayed on the right indicate codes that specify individuals stored in personal information storage area 117b. The key displays an individual name stored together with each code. The user selects a person for whom display is provided on the display portion, using a key. One or more persons may be selected. If the user who is not displayed is to be selected, the choices displayed in (a), (b), (c), (d) can be changed in order by scrolling.

After finishing selection, a decision key is pressed so that a user for whom display is provided on each message display portion is specified and then stored in display location information storage area 117c.

By repeating such an operation, a user for whom display is provided on each message display portion can be stored in display location information storage area 117c.

In storage area 117, information about the originator of a task is specified in personal information storage area 117b based on the kind of the task and the communication information of the task, and reference is made to display location information storage area 117c. In display location information storage area 117c, based on the reference information, which message display portion should receive a message is specified.

Figure 19:
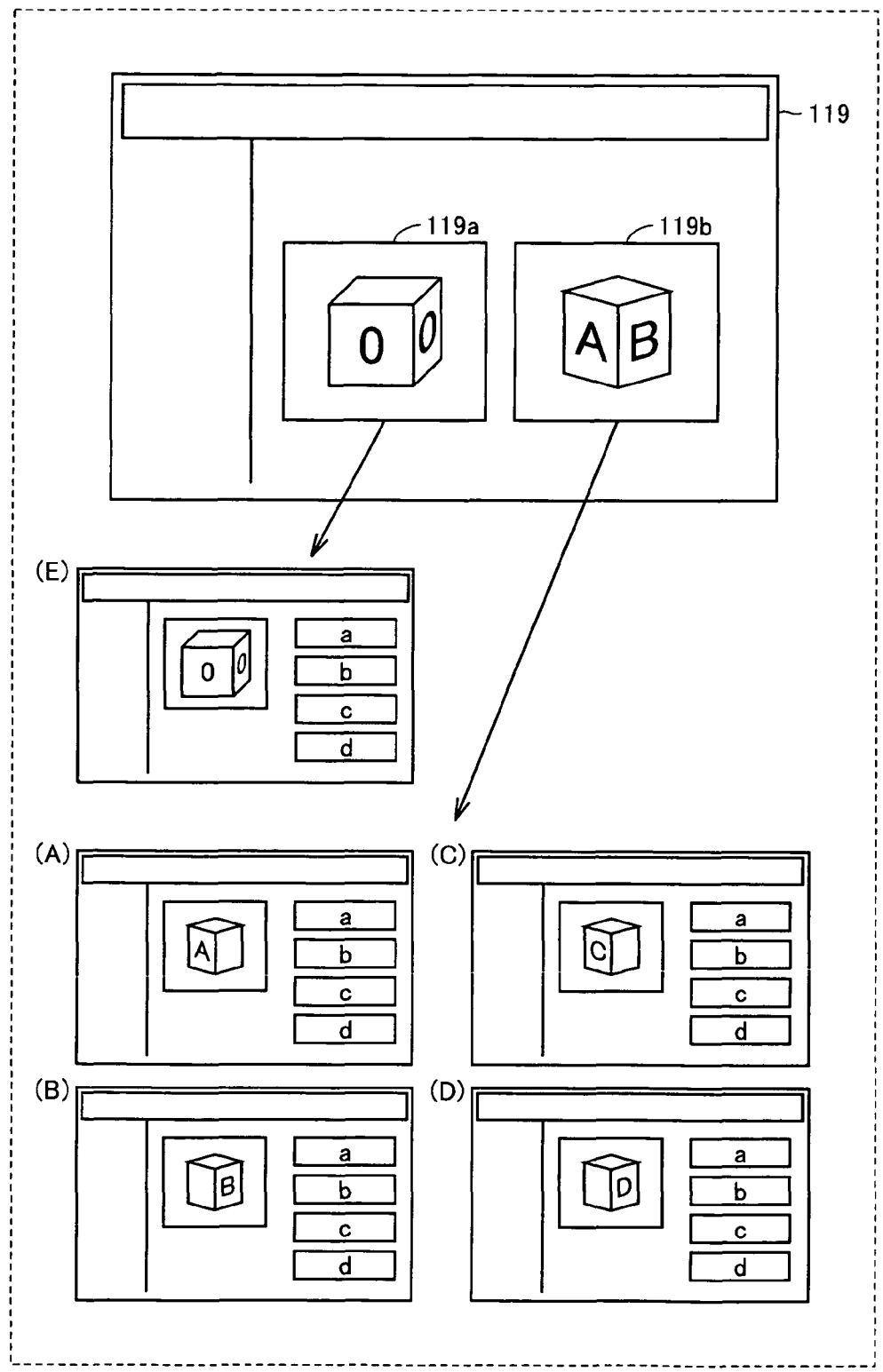

FIG. 19 shows a specific example of a setting window of a message display location.

The operation window on operation portion 119 allows selection of the same message or a different message to be displayed on each message display portion.

First, the user selects whether the same message or a different message is displayed on each display portion, on the screen of operation portion 119. The screen includes a touch panel so that a display manner is selected by directly touching any given picture. In the example in the figure, a left selection portion 119a is a key to select display of the same message on all the display portions, and a right selection portion 119b is a key to select of display of a different message on each display portion.

When left selection portion 119a is selected, a transition to window (E) takes place. Window (E) shows that a mode of displaying the same message on all the message display portions is selected. The keys (a), (b), (c), (d) displayed on the right side indicate the kinds of tasks or errors.

The user selects a task or error to be displayed in all the message display portions using these keys. One kind or different kinds may be selected. In addition, a task or error that is not displayed can be selected by changing the choices displayed in (a), (b), (c), (d) in order by scrolling. Alternatively, all can be selected collectively.

After finishing selection, a decision key is pressed, so that a task or error to be displayed in all of the message display portions is specified and then stored in display location information storage area 117c.

Here, the choices may be users. In this case, choice switching keys are provided so that the choices to be displayed in (a), (b), (c), (d) may be switched between the task or error choices or the user information choices.

When right selection portion 119a is selected on the screen of operation portion 119, a transition to the window of operation portion 119 in FIG. 18 takes place. The method of selecting a kind of tasks or errors to be displayed in each display portion is similar as described in FIG. 18. Here, the choices may also be users. The procedure in this case is also similar as described above.

Furthermore, for a particular error message, a display location for each error is stored beforehand as a program in display location information storage area 117c. For example, when jamming occurs, control portion 115 notifies storage area 117 of the detected occurrence location code. Based on this information, storage area 117 specifies a display location based on the codes stored beforehand in display location information storage area 117c.

This process allows the display such as "please open the lower door to clear the paper jam" or the like to appear on the message display portion on the face that has an openable door from which a processing operation should actually be performed as shown in FIG. 8.

Figure 20:
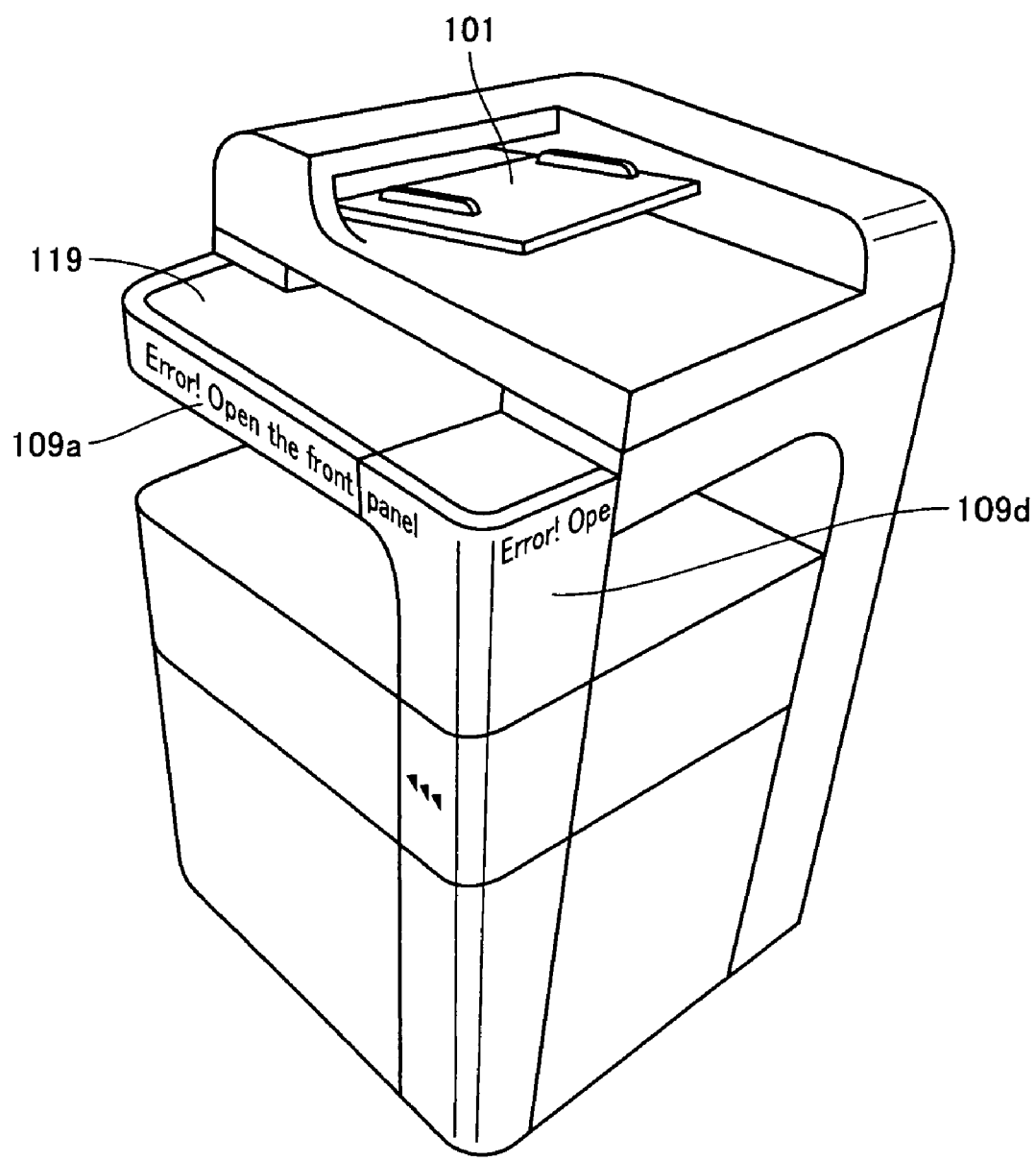
FIG. 20 shows a first specific example of an external view of an image forming apparatus.
Figure 21:
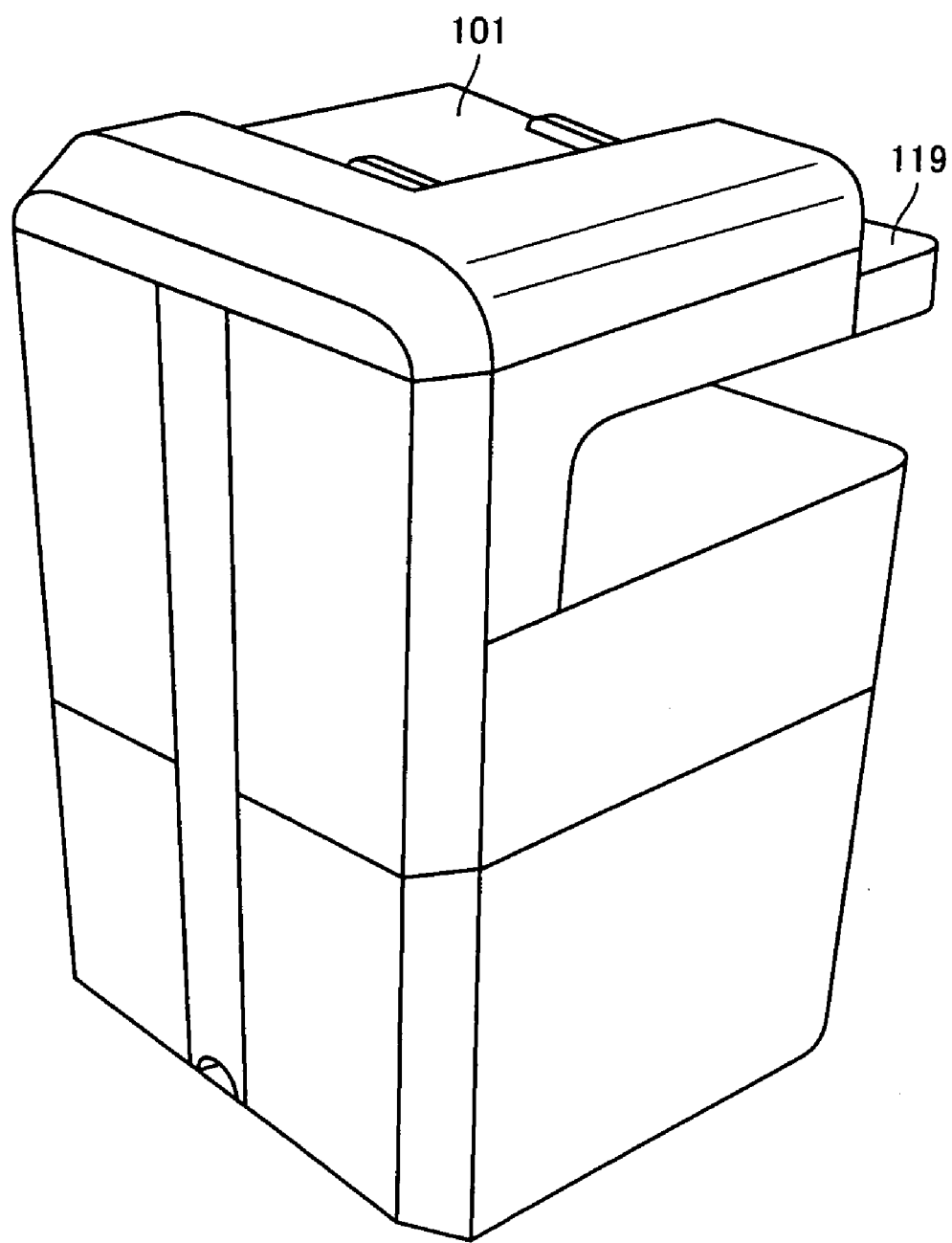
FIG. 21 shows an external view of the image forming apparatus in FIG. 20 as viewed from another direction.

FIG. 20 shows a first specific example of an external view of an image forming apparatus, and FIG. 21 shows an external view of the image forming apparatus in FIG. 20 as viewed from another direction.

Image reading portion 101 is positioned on the top of the apparatus and operation portion 119 is installed facing upward. Message display portion 109a is positioned on the front face of the apparatus, and message display portion 109d is positioned on the side face of the apparatus. Message display portions 109a, 109d each have a portion that extends in the vertical direction and a portion that extends in the horizontal direction. In this manner, a message can be displayed in such a manner as to flow in the message display portion. The direction of flow can be set as desired to be adapted to the case where the directions in which characters flow are different in the horizontal direction depending on languages (for example, in the case where Arabic is displayed).

In addition, characters appear in a flowing manner or are deleted after a prescribed period of time, so that it is possible to prevent a message concerning a job suspended or cancelled in the even of an error from being left to cause a discrepancy from the actual state.

In addition, when the message display portion is arranged in the vertical direction, in the image forming apparatus having the functions (the paper feeding portion, the printing portion, the paper ejection portion, and the like) arranged in the vertical direction, such display can be made that directly points at the actual movement or part of the apparatus. For example, in FIG. 20, that part of the front panel which should be operated by the user is indicated by black triangles and a message that suggests opening the front panel appears on the message display portion. Because of such display, it can be visually indicated, for example, that the engine portion or the paper tray portion should be accessed (in the even of a jam or at the time of paper supply), when necessary.

Furthermore, the message display portion may be arranged to protrude form the image forming apparatus, so that a message can be seen by a person farther away from the location of the apparatus.

It is noted that, as shown in FIGS. 20 and 21, the image forming apparatus may have at least two message display portions that face in different directions.

Figure 22:
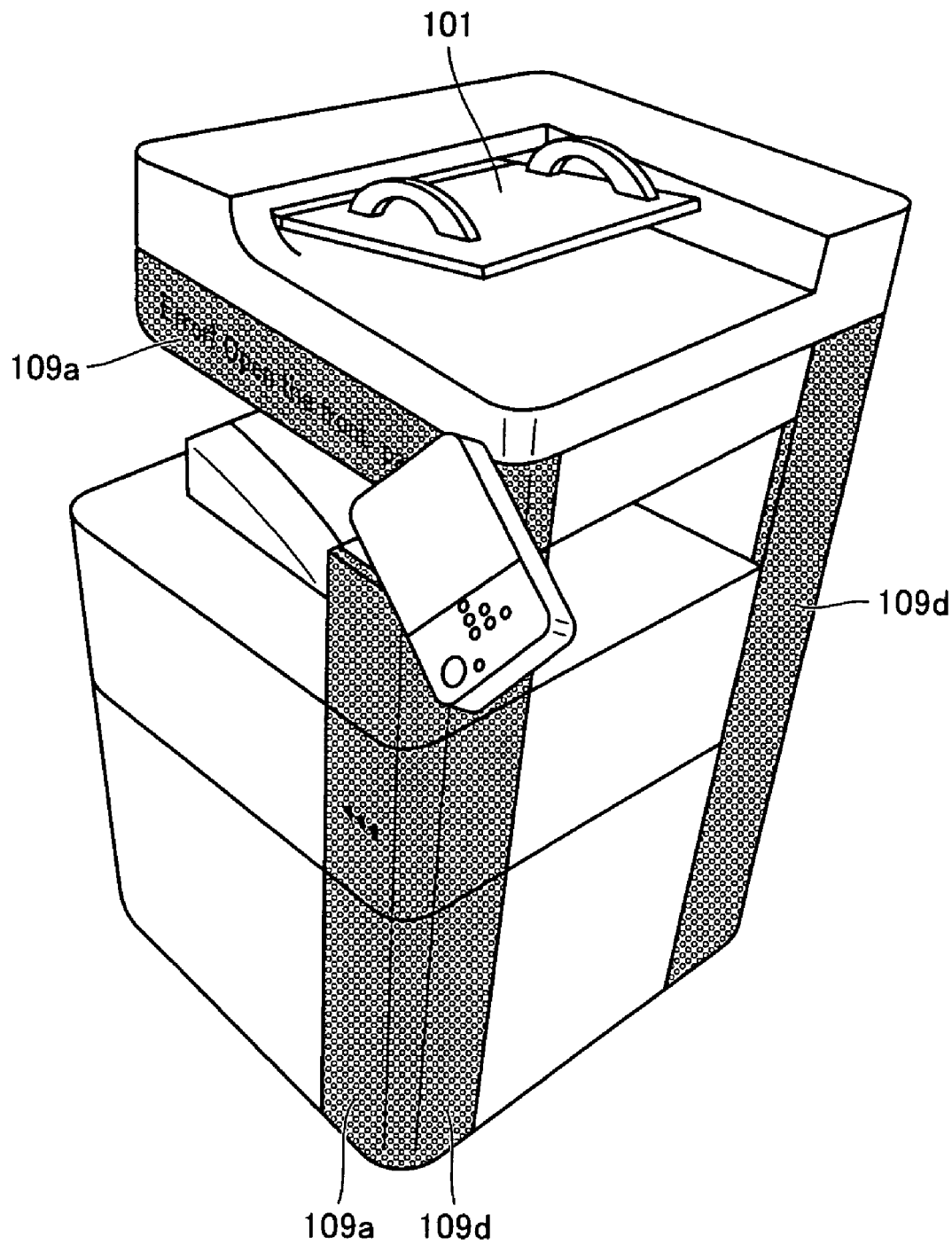
FIG. 22 shows a second specific example of an external view of an image forming apparatus.
Figure 23:
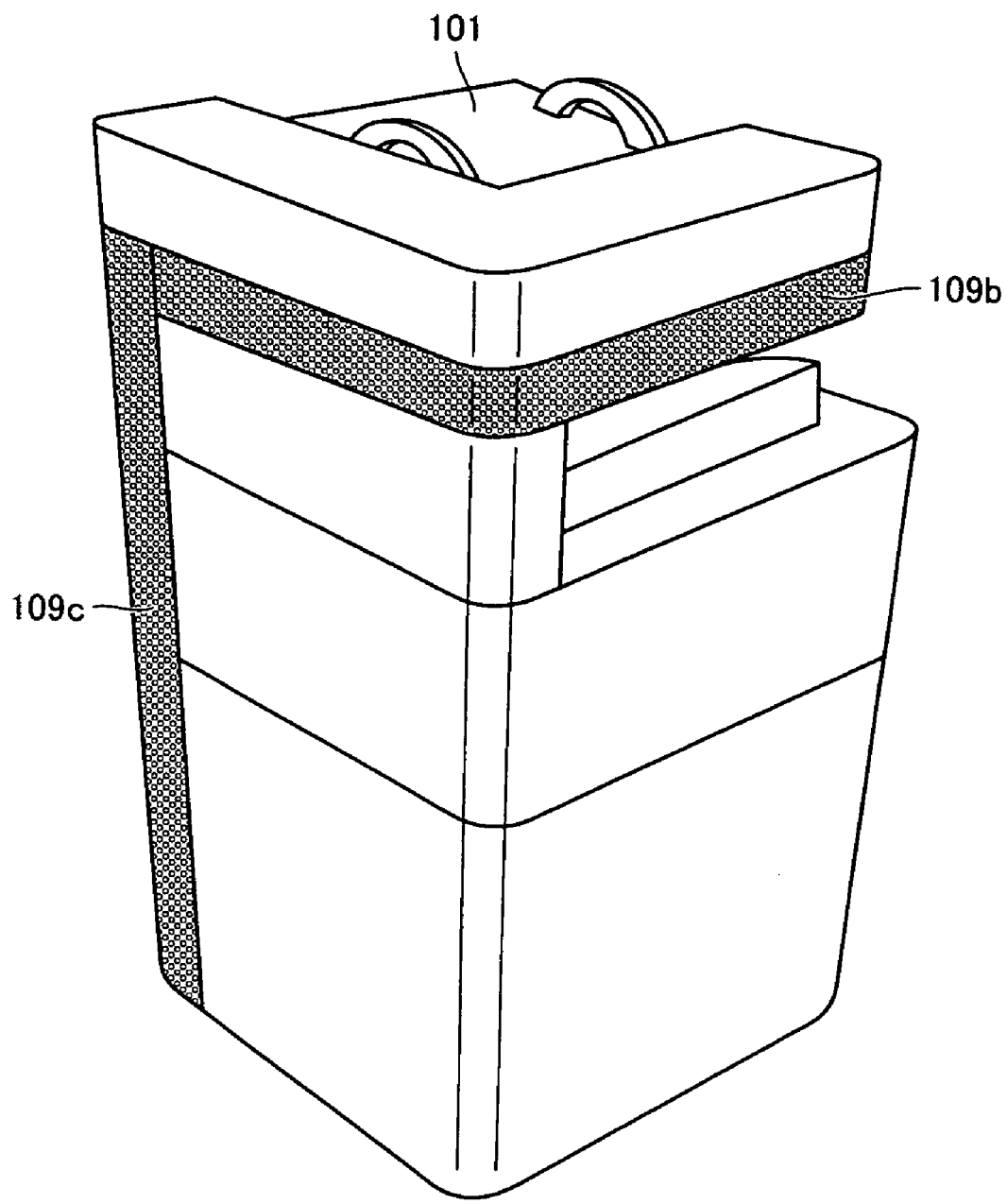
FIG. 23 shows an external view of the image forming apparatus in FIG. 22 as viewed from the different direction.

FIG. 22 shows a second specific example of an external view of an image forming apparatus, and FIG. 23 shows an external view of the image forming apparatus in FIG. 22 as viewed from the different direction.

In this example, message display portions 109a-109d are provided on the four sides of the apparatus. Message display portions 109a-109d are connected to one another, so that a message can flow, for example, in the order of message display portion 109a→message display portion 109b→message display portion 109c. Specifically, characters may be displayed in a flowing manner on message display portion 109a and the characters which finished flowing may also be displayed in a flowing manner on message display portion 109b.

Figures 24, 25, 26:
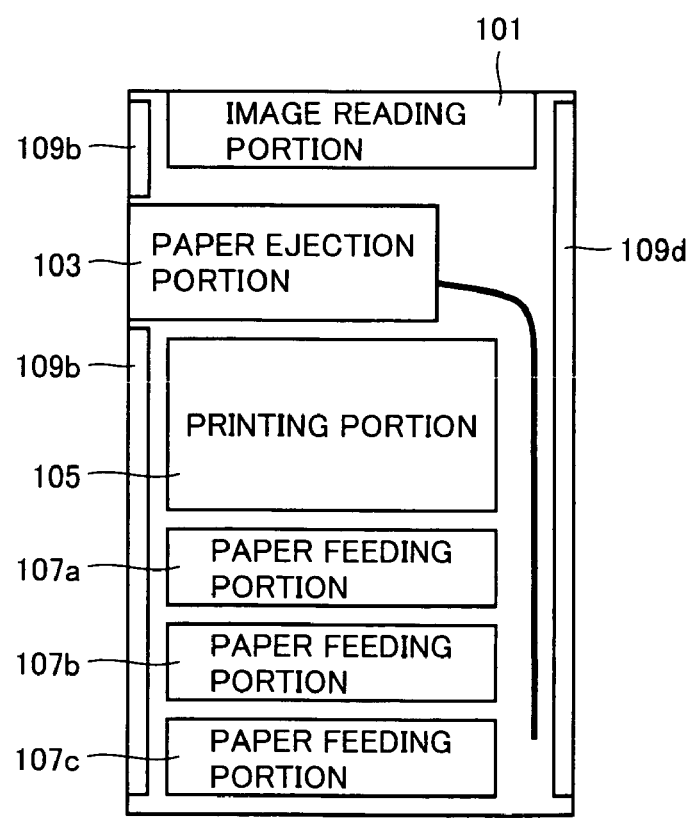
FIGS. 24 and 25 show exemplary display of a message display portion as viewed from the front.
FIG. 26 shows a modification of the image forming apparatus in FIG. 1.

FIGS. 24 and 25 show exemplary display of the message display portion as viewed from the front.

In this example, message display portions 109a-109d show a message by means of light-emission from LED through punching metal sheets (metal sheets provided with a number of small holes).

In addition, the display may be in color according to the contents of messages. In this manner, communication can be more intuitive according to any particular part, state, priority or emergency level.

FIG. 26 shows a modification of the image forming apparatus in FIG. 1.

In this example, message display portions 109b, 109d are arranged on the entire face of the image forming apparatus.

Therefore, a long message can be displayed at a time. In addition, characters may be enlarged so that a message can be seen from a person farther away from the location of the apparatus. Moreover, the enlarged characters allow some visually handicapped people to see a message.

Furthermore, the message display potion is arranged on the entire face of the image forming apparatus so that such display can be made that directly points at the actual movement or part of the apparatus. In addition, information including images, animation, or the like can be displayed.

EFFECT IN EMBODIMENT

In accordance with the embodiment as described above, a message display portion is provided so that the user can see an operational state of the apparatus from a distant location. Accordingly, the user can pick up his print when his job is surely finished, thereby avoiding a wasting operation concerning retrieval of print.

In addition, an operational state of the apparatus can be observed from a distant location, thereby reducing the risk of leaving the unexecuted job in the even of an error. Therefore, the wasted time in the entire workflow can be eliminated.

In addition, the trouble of the user going see if any FAX document for himself has arrived can be saved. Moreover, such an accident can be eliminated in that a FAX document for a particular user is being left.

Furthermore, such a situation can be prevented in that the user has to wait adjacent to the apparatus until completion of a job, thereby eliminating wasting time.

In addition, a consumable supply instruction or the like appears on the message display portion so that information that should be shared by the users can be made widely known. Thus, the apparatus downtime can be shortened, thereby eliminating wasting time.

Furthermore, a plurality of message display portions are provided so that more different information can be displayed at a time. In addition, more information can be displayed for one message.

Moreover, only information necessary for a particular user is displayed so that the risk of necessary information being lost in much information can be avoided.

Furthermore, information that encourages a physical operation is displayed in vicinity of the actual operation location, so that the reliability of communication can be improved.

Here, a message is displayed in a flowing manner on the message display portion, and the flowing direction can be set as desired in order to be adapted to the case where the directions in which characters flow are opposite in the horizontal direction depending on languages (the case where Arabic is displayed, or the like).

In addition, characters are displayed in flowing manner or deleted after a prescribed period of time, so that it can be prevented that a message concerning a job that is suspended or canceled in the even of an error is left as it is to cause a discrepancy from the actual state.

Furthermore, the message display portion is arranged in the vertical direction in the image forming apparatus having functions (the paper feeding portion, the printing portion, the paper ejection portion, and the like) arranged in the vertical direction, thereby allowing such display that directly points at the actual movement or part of the apparatus.

Moreover, the message display portion may be arranged to protrude from the image forming apparatus, so that a message can be seen from a person farther away from the location of the apparatus.

In addition, the message display portion may be arranged on the entire face of the image forming apparatus, so that a longer message can be displayed at a time. Furthermore, characters can be enlarged, so that a message can be seen from a person farther away from the location of the apparatus. In addition, the enlarged characters allow some visually handicapped people to see the message.

In addition, the message display portion may be arranged on the entire face of the image forming apparatus to allow such display that directly points at the actual movement or part of the apparatus. Furthermore, information including images, animation or the like can be displayed.

Furthermore, a message can be provided with color information, so that more intuitive communication can be achieved according to a particular part, state, priority, emergency level, or the like.

In accordance with the present invention, it is possible to provide an image forming apparatus capable of indicating a state of the apparatus in a user-friendly manner, and a method of controlling an image forming apparatus.

[Others]

It is noted that a message may be formed of characters or document, or a message using symbols may be displayed.

The present invention can be carried out on an image forming apparatus such as a facsimile machine, copier, or PC.

It is noted that the processes in the embodiment above may be performed by software or using a hardware circuit.

Furthermore, a program that performs the processes in the forgoing embodiment can be provided. That program may be recorded in a recording medium such as CD-ROM, flexible disk, hard disk, ROM, RAM, or memory card to be provided to users. Alternatively, the program may be downloaded to the apparatus via a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus having a plurality of faces, comprising:
    a printer printing an image;
    a first message display portion provided on a first face of the plurality of faces;
    a second message display portion provided on a second face facing in a direction different from the first face of the plurality of faces;
    a storage portion storing display location information in which a user and each of the message display portions are associated with each other;
    a state detector detecting a state of the image forming apparatus;
    a specification portion specifying the user relating to the detected state;
    a decider deciding a message to be displayed and deciding, from the first message display portion and the second message display portion, a message display portion on which the decided message is to be displayed based on the state detected by the state detector and the display location information corresponding to the user specified by the specification portion; and
    a display portion displaying the decided message on the decided message display portion.

2. The image forming apparatus according to claim 1, wherein the state detector detects a printing state of the image forming apparatus, the specification portion specifies a print instructor as the user relating to the detected state, and the display portion displays the decided message on the message display portion associated with the print instructor.

3. The image forming apparatus according to claim 1, characterized in that the image forming apparatus has respective message display portions in directions of four faces.

4. The image forming apparatus according to claim 1, wherein
    the image forming apparatus has a facsimile function,
    the specification portion specifies a facsimile recipient as the user relating to the detected state, and when a facsimile image is received, the display portion displays a notification of reception on the message display portion associated with the facsimile recipient.

5. The image forming apparatus according to claim 1, wherein
the image forming apparatus has an automatic document feeder and a reading function,
the specification portion specifies a reading instructor as the user relating to the detected state, and
when reading of an entire document is finished, a notification that reading is finished is displayed on the message display portion associated with the reading instructor.

6. The image forming apparatus according to claim 1, characterized in that a same message is displayed on the first and second message display portions.

7. The image forming apparatus according to claim 1, characterized in that different messages are displayed on the first and second message display portions.

8. The image forming apparatus according to claim 1, wherein the decider decides on a message display portion for display according to a content of a message.

9. The image forming apparatus according to claim 1, further comprising a selector selecting whether a same message is displayed or different messages are displayed on the first and second message display portions.

10. The image forming apparatus according to claim 1, wherein selection is made from the first and second message display portions to display a message.

11. The image forming apparatus according to claim 1, wherein a character is displayed in a flowing manner on one of the first and second message display portions and the character that has finished flowing is also displayed in a flowing manner on the other of the first and second message display portions.

12. The image forming apparatus according to claim 11, further comprising a setter setting a direction in which a character is displayed in a flowing manner.

13. The image forming apparatus according to claim 1, wherein the state detector detects at least one of completion of an image input, a start of image printing, an end of image printing, a number of copies, and errors.

14. The image forming apparatus according to claim 1, characterized in that a message displayed on at least one of the first and second message display portions is deleted after a prescribed period of time.

15. The image forming apparatus according to claim 1, further comprising:
a receiver externally receiving a print job wherein
the specification portion specifies a print instructor of the print job as the user relating to the detected state,
the decider decides on a message display portion on which a message is to be displayed according to the print instructor.

16. The image fondling apparatus according to claim 1, wherein the first message display portion is arranged in a vertical direction.

17. The image forming apparatus according to claim 1, wherein the first message display portion is arranged to protrude from the image forming apparatus.

18. The image forming apparatus according to claim 1, wherein the first message display portion is arranged on an entire face of the image forming apparatus.

19. The image forming apparatus according to claim 1, characterized in that a color of a displayed message is decided according to a content of the decided message.

20. The image forming apparatus according to claim 1, characterized in that the decider decides respective contents to be displayed on the first message display portion and the second message display portion based on a result of detection by the state detector.

21. A method of controlling an image forming apparatus having a plurality of faces, the image forming apparatus including
a printer printing an image,
a first message display portion provided on a first face of the plurality of faces, and
a second message display portion provided on a second face facing in a direction different from the first face of the plurality of faces, comprising:
a storing step of storing display location information in which a user and each of the message display portions are associated with each other;
a state detecting step of detecting a state of the image forming apparatus;
a specifying step of specifying the user relating to the detected state;
a decision step of deciding a message to be displayed and deciding, from the first message display portion and the second message display portion, a message display portion on which the decided message is to be displayed based on the state detected at the state detection step and the display location information corresponding to the user specified at the specification step; and
displaying the decided message on the decided message display portion.

* * * * *